(12) United States Patent
Liu et al.

(10) Patent No.: US 11,483,093 B2
(45) Date of Patent: Oct. 25, 2022

(54) INDICATION METHOD, INDICATION DETERMINING METHOD, SENDING DEVICE, AND RECEIVING DEVICE

(71) Applicant: Huawei Technologies Co., Ltd., Shenzhen (CN)

(72) Inventors: Yun Liu, Shenzhen (CN); Jian Wang, Beijing (CN); Da Wang, Shenzhen (CN); Yifan Xue, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 83 days.

(21) Appl. No.: 16/646,908

(22) PCT Filed: May 17, 2018

(86) PCT No.: PCT/CN2018/087206
§ 371 (c)(1),
(2) Date: Mar. 12, 2020

(87) PCT Pub. No.: WO2019/062154
PCT Pub. Date: Apr. 4, 2019

(65) Prior Publication Data
US 2020/0266917 A1    Aug. 20, 2020

(30) Foreign Application Priority Data

Sep. 30, 2017   (CN) .......................... 201710923215.4

(51) Int. Cl.
*H04L 1/00*       (2006.01)
*H04W 72/04*   (2009.01)

(52) U.S. Cl.
CPC ........... *H04L 1/003* (2013.01); *H04W 72/042* (2013.01); *H04W 72/0446* (2013.01); *H04W 72/0453* (2013.01)

(58) Field of Classification Search
CPC . H04L 41/0803; H04L 5/0007; H04L 5/0053; H04L 1/0006; H04L 1/003;
(Continued)

(56) References Cited

U.S. PATENT DOCUMENTS

2009/0086700 A1   4/2009 Malladi et al.
2014/0120935 A1   5/2014 Li et al.
(Continued)

FOREIGN PATENT DOCUMENTS

CN     101902270 A    12/2010
CN     102869083 A     1/2013
(Continued)

OTHER PUBLICATIONS

R1-1612062, Qualcomm Incorporated, "Control channel for slot format indicator," 3GPP TSG-RAN WG1 #87, Reno, Nevada, USA, Nov. 14-18, 2016, 2 pages.
(Continued)

*Primary Examiner* — Dady Chery
(74) *Attorney, Agent, or Firm* — Conley Rose, P.C.

(57) ABSTRACT

This application relates to the field of wireless communications technologies, and provides an indication method, an indication determining method, a sending device, and a receiving device, to resolve a problem existing in a transmission technology solution in which a slot format is indicated by using single indication information. The indication determining method includes: receiving, by a receiving device in a first slot, first indication information and second indication information that are sent by a sending device; and determining, by the receiving device, that the first indication information indicates a slot format of the first slot, and that the second indication information indicates a slot format of a second slot, where the second slot is a slot
(Continued)

after the first slot. This application is applicable to a scenario in which a slot format is configured for a slot.

20 Claims, 19 Drawing Sheets

(58) Field of Classification Search
CPC .......... H04L 5/0092; H04W 72/0446; H04W 72/042; H04W 88/08; H04W 72/1257; H04W 72/0453
See application file for complete search history.

(56) References Cited

U.S. PATENT DOCUMENTS

| 2018/0309513 | A1* | 10/2018 | Kim .................... H04B 7/2643 |
| 2019/0089584 | A1* | 3/2019 | Islam .................. H04L 41/0803 |
| 2020/0120672 | A1* | 4/2020 | Shen .................... H04W 72/12 |

FOREIGN PATENT DOCUMENTS

| CN | 104363975 A | 2/2015 |
| CN | 109379782 A | 2/2019 |
| WO | 2012026869 A1 | 3/2012 |
| WO | 2017139097 A1 | 8/2017 |

OTHER PUBLICATIONS

R1-1612565, Samsung, "Signaling of Slot Structure," 3GPP TSG RAN WG1 #87, Reno, USA, Nov. 14-18, 2016, 3 pages.
R1-1704324, AT&T, "Mini-slot based DL/UL data scheduling mechanisms in NR," 3GPP TSG RAN WG1 Meeting #88bis, Spokane, USA, Apr. 3-7, 2017, 5 pages.
R1-1704902, LG Electronics, "Discussion on slot structure indication," 3GPP TSG RAN WG1 Meeting #88bis, Spokane, US, Apr. 3-7, 2017, 5 pages.
R1-1707651, LG Electronics, "Discussion on multi-slot/cross-slot scheduling for NR," 3GPP TSG RAN WG1 Meeting #89, Hangzhou, P.R. China, May 15-19, 2017, 4 pages.

* cited by examiner

| Symbol 0 | Symbol 1 | Symbol 2 | Symbol 3 | Symbol 4 | Symbol 5 | Symbol 6 | Symbol 7 | Symbol 8 | Symbol 9 | Symbol 10 | Symbol 11 | Symbol 12 | Symbol 13 |
|---|---|---|---|---|---|---|---|---|---|---|---|---|---|

Slot format

FIG. 7

INDICATION METHOD, INDICATION DETERMINING METHOD, SENDING DEVICE, AND RECEIVING DEVICE

CROSS-REFERENCE TO RELATED APPLICATIONS

This application is a National Stage of International Patent Application No. PCT/CN2018/087206, filed on May 17, 2018, which claims priority to Chinese Patent Application No. 201710923215.4, filed on Sep. 30, 2017. Both of the aforementioned applications are hereby incorporated by reference in their entireties.

TECHNICAL FIELD

This application relates to the field of wireless communications technologies, and in particular, to an indication method, an indication determining method, a sending device, and a receiving device.

BACKGROUND

For 5th generation (5th Generation, 5G) new radio (New Radio, NR), a slot (Slot) is used as a scheduling unit. One slot may include 14 symbols, and each symbol has a different function (for example, supporting uplink transmission, downlink transmission, and the like). Therefore, one slot format includes a plurality of types of symbols for various uses. Several common slot formats generally include a slot format in which all symbols are uplink symbols (in other words, functions of all the 14 symbols are uplink transmission), a slot format in which all symbols are downlink symbols (in other words, functions of all the 14 symbols are downlink transmission), and a slot format in which some symbols are downlink symbols and the other symbols are uplink symbols (in other words, functions of some symbols are downlink transmission, and functions of the other symbols are uplink transmission). Because a terminal usually performs transmission with a base station based on a slot format, the base station usually sends, to the terminal in a current slot, indication information used to indicate a slot format, so that after receiving the indication information, the terminal may determine the slot format of the current slot.

In a conventional technical solution, the base station usually uses the foregoing indication information to indicate a slot format of each slot. Specifically, the base station adds the indication information to the first one to three downlink symbols in each slot, so that the terminal may determine the slot format of the slot based on the indication information carried in the slot. In addition, the base station may further send, to the terminal, indication information used to indicate a quantity N (N is an integer greater than or equal to 2) of repetition times of indication information in a slot, so that the terminal may determine that a slot format indicated by the indication information is used for both the slot and N-1 slots after the slot.

However, in an actual process, not the first one to three symbols in all slots are downlink symbols. Therefore, when a symbol at the beginning of any slot is not a downlink symbol, the slot cannot carry the foregoing indication information.

SUMMARY

Embodiments of the present invention provide an indication method, an indication determining method, a sending device, and a receiving device, to resolve a problem existing in a transmission technology solution in which a slot format is indicated by using single indication information.

According to a first aspect, this application provides an indication determining method, including: receiving, by a receiving device in a first slot, first indication information and second indication information that are sent by a sending device, where the first indication information indicates a slot format of the first slot, the second indication information indicates a slat format of a second slot, and the second slot is a slot after the first slot.

According to the indication determining method provided in this embodiment of the present invention, the receiving device receives, in the first slot, the first indication information and the second indication information that are sent by the sending device. Indication information allocated to two different slots is carried in one slot, so that the receiving device may determine the slot format of the first slot based on the first indication information and determine the slot format of the second slot based on the second indication information. In this way, the receiving device may perform uplink transmission or downlink receiving with the sending device in the first slot based on the determined slot format of the first slot. In addition, the receiving device may determine a slot format of a slot after the first slot. Therefore, when performing scheduling in the second slot, the receiving device performs uplink transmission or downlink receiving with the sending device in the second slot. In comparison with a conventional technical solution in which one slot can carry indication information of only one slot format, in this application, not only the slot format of the first slot may be indicated, but also the slot format of the slot after the first slot may be indicated when the first one to three symbols of the slot (for example, the second slot) after the first slot cannot be used to carry the second indication information. In addition, in this application, the slot format indicated by the first indication information and the slot format indicated by the second indication information may be the same or different, so that the receiving device performs uplink transmission and downlink receiving with the sending device in two different slots based on different slot formats.

With reference to the first aspect, in a first possible implementation of the first aspect, the receiving device determines the slot format of the first slot based on the slot format indicated by the first indication information, and the receiving device determines the slot format of the second slot based on the slot format indicated by the second indication information. Optionally, if a symbol at a first location in the slot format indicated by the first indication information is a downlink symbol, the receiving device determines that the first indication information indicates the slot format of the first slot; and if a symbol at a first location in the slot format indicated by the second indication information is a first symbol, the receiving device determines that the second indication information indicates the slot format of the second slot, where a function of the first symbol is different from a function of the downlink symbol. Indication information indicating a slot format needs to be carried on the first one to three downlink symbols included in a slot format. Therefore, the receiving device may determine that indication information, in the indication information indicating a slot format, that indicates that a symbol at a first location is a downlink symbol is used to indicate the slot format of the first slot, and determine that indication information, in the indication information indicating a slot format, that indicates that a symbol at a first location is a first symbol is used to indicate the slot format of the second slot.

With reference to the first aspect or the first possible implementation of the first aspect, in a second possible implementation of the first aspect, the receiving, by a receiving device in a first slot, first indication information and second indication information that are sent by a sending device may be specifically: receiving, by the receiving device, the first indication information on a first resource; and receiving, by the receiving device, the second indication information on a second resource, where the first resource and the second resource are different. In this way, based on content preconfigured for a base station or negotiated content, the receiving device determines the slot format indicated by the first indication information on the first resource as the slot format of the first slot, determines the slot format indicated by the second indication information received on the second resource as the slot format of the first slot.

With reference to at least one of the first aspect to the second possible implementation of the first aspect, in a third possible implementation of the first aspect, the first resource and the second resource meet any one of the following conditions: the first resource is a first frequency domain resource, and the second resource is a second frequency domain resource; the first resource is a first time domain resource, and the second resource is a second time domain resource; the first resource is a first control resource set, and the second resource is a second control resource set; or the first resource is a first control channel, and the second resource is a second control channel.

With reference to at least one of the first aspect to the third possible implementation of the first aspect, in a fourth possible implementation of the first aspect, the method provided in this application further includes: determining, by the receiving device, a second sequence of obtaining the first indication information and the second indication information from a control channel; and determining, by the receiving device based on the second sequence of obtaining the first indication information and the second indication information from the control channel, that the first indication information indicates the slot format of the first slot, and that the second indication information indicates the slot format of the second slot. The receiving device and the sending device consider by default or agree on that indication information that is earlier obtained from the control channel through parsing is used for the first slot, because the first slot is located before the second slot. In addition, indication information that is later obtained from the control channel through parsing may be alternatively used for the first slot. Signaling overheads can be avoided by using this implicit indication manner.

With reference to at least one of the first aspect to the fourth possible implementation of the first aspect, in a fifth possible implementation of the first aspect, the method provided in this application further includes: if the first indication information carries a first value, determining, by the receiving device, that the first indication information indicates the slot format of the first slot; and if the second indication information carries a second value, determining, by the receiving device, that the second indication information indicates the slot format of the second slot, where the first value and the second value are different. The first indication information and the second indication information each are used to carry a value, for example, the first value and the second value, so that after receiving the first indication information and the second indication information, the receiving device may determine that the first indication information and the second indication information each indicate a slot format of which slot. By using this implicit indication manner, signaling overheads caused because the receiving device and the sending device need additional indication information to indicate which indication information indicates which slot format can be avoided.

With reference to at least one of the first aspect to the fifth possible implementation of the first aspect, in a sixth possible implementation of the first aspect, the method provided in this application further includes: if a control channel on which the first indication information is located carries a third value, determining, by the receiving device, that the first indication information indicates the slot format of the first slot; and if a control channel on which the second indication information is located carries a fourth value, determining, by the receiving device, that the second indication information indicates the slot format of the second slot, where the third value and the fourth value are different. A control channel that carries indication information is used to notify the receiving device that the first indication information is used to indicate the slot format of the first slot, and that the second indication information is used to indicate the slot format of the second slot, so that signaling overheads can be reduced.

According to a second aspect, this application provides an indication determining method, including: receiving, by a receiving device, a set sent by a sending device, where the set includes at least one index, and the index indicates two different slot formats; receiving, by the receiving device in a first slot, a first index sent by the sending device; and determining, by the receiving device from the set, a slot format of the first slot and a slot format of a second slot based on the first index, where the second slot is a slot after the first slot, and the slot format of the first slot and the slot format of the second slot are different.

With reference to the second aspect, in a first possible implementation of the second aspect, a symbol at a first location in the slot format of the first slot is a downlink symbol; and a symbol at a first location in the slot format of the second slot is a first symbol, where a function of the first symbol is different from a function of the downlink symbol.

With reference to the second aspect or the first possible implementation of the second aspect, in a second possible implementation of the second aspect, the function of the first symbol is any one of uplink transmission, an empty resource, an unknown resource, and a reserved resource.

With reference to the second aspect or the first possible implementation of the second aspect, in a second possible implementation of the second aspect, the method provided in this application further includes: receiving, by the receiving device, first indication information sent by the sending device, where the first indication information is used to indicate at least one of N repetition times of the slot format of the first slot and the slot format of the second slot, M repetition times of the slot format of the first slot, and P repetition times of the slot format of the second slot, where N, M, and P are all integers greater than or equal to 2. By receiving second indication information, the receiving device may determine to configure both the slot format of the first slot and the slot format of the second slot in the first slot.

According to a third aspect, an embodiment of the present invention provides an indication method, including: determining, by a sending device, first indication information and second indication information, where the first indication information indicates a slot format of a first slot, the second indication information indicates a slot format of a second slot, and the second slot is a slot after the first slot; and sending, by the sending device, the first indication information and the second indication information to a receiving device in the first slot.

With reference to the third aspect, in a first possible implementation of the third aspect, the determining, by a sending device, first indication information and second indication information includes: if a symbol at a first location in the slot format indicated by the first indication information is a downlink symbol, determining, by the sending device, that the first indication information indicates the slot format of the first slot; and if a symbol at a first location in the slot format indicated by the second indication information is a first symbol, determining, by the sending device, that the second indication information indicates the slot format of the second slot, where a function of the first symbol is different from a function of the downlink symbol.

With reference to the third aspect or the first possible implementation of the third aspect, in a second possible implementation of the third aspect, before the sending, by the sending device, the first indication information and the second indication information to a receiving device in the first slot, the method provided in this application includes: adding, by the sending device, the first indication information to a first resource; and adding, by the sending device, the second indication information to a second resource, where the first resource and the second resource are different.

With reference to any one of the third aspect to the second possible implementation of the third aspect, in a third possible implementation of the third aspect, the first resource and the second resource meet any one of the following conditions: the first resource is a first frequency domain resource, and the second resource is a second frequency domain resource; the first resource is a first time domain resource, and the second resource is a second time domain resource; the first resource is a first control resource set, and the second resource is a second control resource set; and the first resource is a first control channel, and the second resource is a second control channel.

With reference to any one of the third aspect to the third possible implementation of the third aspect, in a fourth possible implementation of the third aspect, before the sending, by the sending device, the first indication information and the second indication information to a receiving device in the first slot, the method provided in this application includes: adding, by the sending device, the first indication information and the second indication information to one control channel in a first sequence, where the first sequence is used to determine that the first indication information indicates the slot format of the first slot, and that the second indication information indicates the slot format of the second slot.

With reference to any one of the third aspect to the fourth possible implementation of the third aspect, in a fifth possible implementation of the third aspect, the first indication information carries a first value, and the first value is used to determine that the first indication information indicates the slot format of the first slot; and the second indication information carries a second value, and the second value is used to determine that the second indication information indicates the slot format of the second slot, where the first value and the second value are different.

With reference to any one of the third aspect to the fifth possible implementation of the third aspect, in a sixth possible implementation of the third aspect, before the sending, by the sending device, the first indication information and the second indication information to a receiving device in the first slot, the method provided in this application includes: adding, by the sending device, a third value to a control channel that carries the first indication information, where the third value is used to determine that the first indication information indicates the slot format of the first slot; and adding, by the sending device, a fourth value to a control channel that carries the second indication information, where the fourth value is used to determine that the second indication information indicates the slot format of the second slot.

According to a fourth aspect, this application provides an indication method, including: configuring, by a sending device for a receiving device, a set including at least one index, where the index indicates slot formats of two different slots; and sending, by the sending device, a first index to the receiving device in a first slot, where the first index is used to determine a slot format of the first slot and a slot format of a second slot, and the second slot is a slot after the first slot.

With reference to the fourth aspect, in a first possible implementation of the fourth aspect, after the sending, by the sending device, a first index to the receiving device in a first slot, the method provided in this application further includes: sending, by the sending device, first indication information to the receiving device, where the first indication information is used to indicate at least one of N repetition times of the slot format of the first slot and the slot format of the second slot. M repetition times of the slot format of the first slot, and P repetition times of the slot format of the second slot, where N, M, and P are all integers greater than or equal to 2.

With reference to the fourth aspect or the first possible implementation of the fourth aspect, in a second possible implementation of the fourth aspect, a symbol at a first location in the slot format of the first slot is a downlink symbol; and a symbol at a first location in the slot format of the second slot is a first symbol, where a function of the first symbol is different from a function of the downlink symbol.

With reference to the fourth aspect to the second possible implementation of the fourth aspect, in a third possible implementation of the fourth aspect, the slot format of the second slot meets at least one of the following conditions: the symbol at the first location in the slot format of the second slot is an uplink symbol, and the first location is corresponding to a location at which a downlink symbol or an empty symbol is located in the slot format of the first slot; a location of an uplink symbol in the first slot is corresponding to a location of an uplink symbol in the second slot; a location of a reserved resource in the first slot is corresponding to a location of a reserved resource in the second slot; a location at which a symbol function is an unknown resource in the first slot is corresponding to a location at which a symbol function is an unknown resource in the second slot; the slot format of the second slot is a slot format in Which a symbol at a location corresponding to a location at which a symbol occupied by a control channel is located in the slot format of the first slot is an unknown resource or an uplink symbol, and all symbols at locations corresponding to locations at which remaining downlink symbols or empty symbols are located in the slot formation of the first slot are uplink symbols; locations at which a downlink symbol and an empty symbol are located in the slot format of the first slot are corresponding to locations at which uplink symbols or unknown resources are located in the slot format of the second slot; or a location at which a downlink symbol is located in the slot format of the first slot is corresponding to a location at which an uplink symbol or an unknown resource is located in the slot format of the second slot.

Correspondingly, according to a fifth aspect, this application provides an indication determining apparatus, and the indication determining apparatus may implement the indication determining method according to any one of the first aspect or the possible implementations of the first aspect. For example, the indication determining apparatus may be a receiving device or a chip disposed in a receiving device. The indication determining apparatus may implement the foregoing method by using software or hardware or by using hardware executing corresponding software.

In a design, the receiving device includes a receiving unit, and the receiving unit is configured to receive, in a first slot, first indication information and second indication information that are sent by a sending device, where the first indication information indicates a slot format of the first slot, the second indication information indicates a slot format of a second slot, and the second slot is a slot after the first slot.

With reference to the fifth aspect, in a first possible implementation of the fifth aspect, the receiving device provided in this application further includes a determining unit, configured to: determine the slot format of the first slot based on the slot format indicated by the first indication information; and determine the slot format of the second slot based on the slot format indicated by the second indication information. Optionally, a function of a symbol at a first location in the slot format indicated by the first indication information is downlink transmission, a function of a symbol at a first location in the slot format indicated by the second indication information is a first symbol, and a function of the first symbol is different from a function of the downlink symbol.

With reference to the fifth aspect or the first possible implementation of the fifth aspect, in a second possible implementation of the fifth aspect, the receiving unit is specifically configured to: receive the first indication information on a first resource, and receive, by the receiving device, the second indication information on a second resource, where the first resource and the second resource are different.

With reference to any one of the fifth aspect to the second possible implementation of the fifth aspect, in a third possible implementation of the fifth aspect, the first resource and the second resource meet any one of the following conditions: the first resource is a first frequency domain resource, and the second resource is a second frequency domain resource; the first resource is a first time domain resource, and the second resource is a second time domain resource; the first resource is a first control resource set, and the second resource is a second control resource set; or the first resource is a first control channel, and the second resource is a second control channel.

With reference to any one of the fifth aspect to the third possible implementation of the fifth aspect, in a fourth possible implementation of the fifth aspect, the determining unit is further configured to: determine a second sequence of obtaining the first indication information and the second indication information from a control channel; and determine, based on the second sequence, that the first indication information indicates the slot format of the first slot, and that the second indication information indicates the slot format of the second slot.

With reference to any one of the fifth aspect to the fourth possible implementation of the fifth aspect, in a fifth possible implementation of the fifth aspect, if the first indication information carries a first value, the determining unit is configured to determine that the first indication information indicates the slot format of the first slot; and if the second indication information carries a second value, the determining unit is configured to determine that the second indication information indicates the slot format of the second slot, where the first value and the second value are different.

With reference to any one of the fifth aspect to the fifth possible implementation of the fifth aspect, in a sixth possible implementation of the fifth aspect, if a control channel that carries the first indication information carries a third value, the determining unit is configured to determine that the first indication information indicates the slot format of the first slot; and a control channel that carries the second indication information carries a fourth value, and the determining unit is configured to determine that the second indication information indicates the slot format of the second slot, where the third value and the fourth value are different.

In a possible design, the indication determining apparatus may include at least one processor and a memory. The processor is configured to support the indication determining apparatus in performing a related message processing or control operation performed on the indication determining apparatus side in the method according to any one of the first aspect or the possible implementations of the first aspect. The memory is configured to be coupled to the at least one processor, and the memory stores a program (instruction) and data that are necessary for the apparatus. In addition, the apparatus may further include a communications interface, configured to support communication between the indication determining apparatus and another network element. The communications interface may be a transceiver, and the transceiver is configured to support the indication determining apparatus in performing related message receiving and sending operations performed on the indication determining apparatus side in the method according to any one of the first aspect or the possible implementations of the first aspect. The memory, the transceiver, and the at least one processor are connected to each other by using a line.

Correspondingly, according to a sixth aspect, this application provides an indication determining apparatus, and the indication determining apparatus may implement the indication determining method according to any one of the second aspect or the possible implementations of the second aspect. For example, the indication determining apparatus may be a receiving device or a chip disposed in a receiving device. The indication determining apparatus may implement the foregoing method by using software or hardware or by using hardware executing corresponding software.

In a possible design, the indication determining apparatus includes a receiving unit and a determining unit. The receiving unit is configured to: receive a set sent by a sending device, where the set includes at least one index, and the index indicates two different slot formats; and receive, in a first slot, a first index sent by the sending device. The determining unit is configured to determine a slot format of the first slot and a slot format of the second slot from the set based on the first index, where the second slot is a slot after the first slot, and the slot format of the first slot and the slot format of the second slot are different.

With reference to the sixth aspect, in a first possible implementation of the sixth aspect, a symbol at a first location in the slot format of the first slot is a downlink symbol; and
a symbol at a first location in the slot format of the second slot is a first symbol, where a function of the first symbol is different from a function of the downlink symbol.

With reference to the sixth aspect or the first possible implementation of the sixth aspect, in a second possible implementation of the sixth aspect, the function of the symbol at the first location in the slot format of the second slot is any one of uplink transmission, an empty resource, an unknown resource, and a reserved resource.

With reference to the sixth aspect or the first possible implementation of the sixth aspect, in a second possible implementation of the sixth aspect, the receiving unit is further configured to receive first indication information sent by the sending device, where the first indication information is used to indicate at least one of N repetition times of the slot format of the first slot and the slot format of the second slot, M repetition times of the slot format of the first slot, and P repetition times of the slot format of the second slot, where N, M, and P are all integers greater than or equal to 2.

In a possible design, the indication determining apparatus may include at least one processor and a memory. The processor is configured to support the indication determining apparatus in performing a related message processing or control operation performed on the indication determining apparatus side in the method according to any one of the second aspect or the possible implementations of the second aspect. The memory is configured to be coupled to the at least one processor, and the memory stores a program (instruction) and data that are necessary for the apparatus. In addition, the apparatus may further include a communications interface, configured to support communication between the indication determining apparatus and another network element. The communications interface may be a transceiver, and the transceiver is configured to support the indication determining apparatus in performing related message receiving and sending operations performed on the indication determining apparatus side in the method according to any one of the second aspect or the possible implementations of the second aspect. The memory, the transceiver, and the at least one processor are connected to each other by using a line.

According to a seventh aspect, this application provides an indication apparatus, and the indication apparatus may implement the indication method according to any one of the third aspect or the possible implementations of the third aspect. For example, the indication apparatus may be a sending device or a chip disposed in a sending device. The indication apparatus may implement the foregoing method by using software or hardware or by using hardware executing corresponding software.

In a possible design, the sending device includes a sending unit, configured to send first indication information and second indication information to the receiving device in the first slot, where the first indication information indicates a slot format of the fast slot, the second indication information indicates a slot format of a second slot, and the second slot is a slot after the first slot.

With reference to the seventh aspect, in a first possible implementation of the seventh aspect, the sending device further includes a determining unit, configured to: determine that the first indication information indicates the slot format of the first slot, and determine that the second indication information indicates the slot format of the second slot, where a function of a first symbol is different from a function of a downlink symbol.

With reference to the seventh aspect or a second possible implementation of the seventh aspect, in a third possible implementation of the seventh aspect, the sending device further includes a processing unit, configured to: add the first indication information to a first resource, and add the second indication information to a second resource, where the first resource and the second resource are different.

With reference to any one of the seventh aspect to a fourth possible implementation of the seventh aspect, in a fourth possible implementation of the seventh aspect, the first resource and the second resource meet any one of the following conditions: the first resource is a first frequency domain resource, and the second resource is a second frequency domain resource; the first resource is a first time domain resource, and the second resource is a second time domain resource; the first resource is a first control resource set, and the second resource is a second control resource set; or the first resource is a first control channel, and the second resource is a second control channel.

With reference to any one of the seventh aspect to a fifth possible implementation of the seventh aspect, in a fifth possible implementation of the seventh aspect, the processing unit is further configured to add the first indication information and the second indication information to one control channel in a first sequence, where the first sequence is used to determine that the first indication information indicates the slot format of the first slot, and that the second indication information indicates the slot format of the second slot.

With reference to any one of the seventh aspect to a sixth possible implementation of the seventh aspect, in a sixth possible implementation of the seventh aspect, the first indication information carries a first value, and the first value is used to determine that the first indication information indicates the slot format of the first slot; and the second indication information carries a second value, and the second value is used to determine that the second indication information indicates the slot format of the second slot, where the first value and the second value are different.

With reference to any one of the seventh aspect to a seventh possible implementation of the seventh aspect, in an eighth possible implementation of the seventh aspect, the processing unit is further configured to: add a third value to a control channel that carries the first indication information, where the third value is used to determine that the first indication information indicates the slot format of the first slot; and add a fourth value to a control channel that carries the second indication information, where the fourth value is used to determine that the second indication information indicates the slot format of the second slot.

In a possible design, the indication determining apparatus may include at least one processor and a memory. The processor is configured to support the indication apparatus in performing a related message processing or control operation performed on the indication apparatus side in the method according to any one of the third aspect or the possible implementations of the third aspect. The memory is configured to be coupled to the at least one processor, and the memory stores a program (instruction) and data that are necessary for the apparatus. In addition, the apparatus may further include a communications interface, configured to support communication between the indication determining apparatus and another network element. The communications interface may be a transceiver, and the transceiver is configured to support the indication apparatus in performing related message receiving and sending operations performed on the indication apparatus side in the method according to any one of the third aspect or the possible implementations of the third aspect. The memory, the transceiver, and the at least one processor are connected to each other by using a line.

According to an eighth aspect, this application provides an indication apparatus, and the indication apparatus may implement the indication method according to any one of the fourth aspect or the possible implementations of the fourth aspect. For example, the indication apparatus may be a sending device or a chip disposed in a sending device. The indication apparatus may implement the foregoing method by using software or hardware or by using hardware executing corresponding software.

In a possible design, the sending unit includes a configuration unit and a sending unit. The configuration unit is configured to configure a set for a receiving device, where the set includes at least one index, and the index indicates slot formats of two different slots. The sending unit is configured to send a first index to the receiving device in a first slot, where the first index is used to determine a slot format of the first slot and a slot format of a second slot, the second slot is a slot after the first slot, and the slot format of the first slot and the slot format of the second slot are different.

With reference to the eighth aspect, in a first possible implementation of the eighth aspect, the sending unit is further configured to send first indication information to the receiving device, where the first indication information is used to indicate at least one of N repetition times of the slot format of the first slot and the slot format of the second slot, M repetition times of the slot format of the first slot, and P repetition times of the slot format of the second slot, where N, M, and P are all integers greater than or equal to 2.

With reference to the eighth aspect or the first possible implementation of the eighth aspect, in a second possible implementation of the eighth aspect, a symbol at a first location in the slot format of the first slot is a downlink symbol; and a symbol at a first location in the slot format of the second slot is a first symbol, where a function of the first symbol is different from a function of the downlink symbol.

With reference to at least one of the eighth aspect to the second possible implementation of the eighth aspect, in a third possible implementation of the eighth aspect, the slot format of the second slot meets at least one of the following conditions: the symbol at the first location in the slot format of the second slot is an uplink symbol, and the first location is corresponding to a location at which a downlink symbol or an empty symbol is located in the slot fortnat of the first slot; a location of an uplink symbol in the first slot is corresponding to a location of an uplink symbol in the second slot; a location of a reserved resource in the first slot is corresponding to a location of a reserved resource in the second slot; a location at which a symbol function is an unknown resource in the first slot is corresponding to a location at which a symbol function is an unknown resource in the second slot; the slot format of the second slot is a slot format in which a function of a symbol at a location corresponding to a location at which a symbol occupied by a control channel is located in the slot format of the first slot is an unknown resource or uplink transmission, and all symbols at locations corresponding to locations at which remaining downlink symbols or empty symbols are located in the slot formation of the first slot are uplink symbols; locations at which a downlink symbol and an empty symbol are located in the slot format of the first slot are corresponding to locations at which an uplink transmission function is supported or at which unknown resources are located in the slot format of the second slot; or a location at which a downlink symbol is located in the slot format of the first slot is corresponding to a location at which an uplink symbol or an unknown resource is located in the slot format of the second slot.

In a possible design, the indication apparatus may include at least one processor and a memory. The processor is configured to support the indication determining apparatus in performing a related message processing or control operation performed on the indication determining apparatus side in the method according to any one of the fourth aspect or the possible implementations of the fourth aspect. The memory is configured to be coupled to the at least one processor, and the memory stores a program (instruction) and data that are necessary for the apparatus. In addition, the apparatus may further include a communications interface, configured to support communication between the indication determining apparatus and another network element. The communications interface may be a transceiver, and the transceiver is configured to support the indication determining apparatus in performing related message receiving and sending operations performed on the indication determining apparatus side in the method according to any one of the fourth aspect or the possible implementations of the fourth aspect. The memory, the transceiver, and the at least one processor are connected to each other by using a line.

According to a ninth aspect, this application provides a chip system, applied to a receiving device, including at least one processor, a memory, and an interface circuit, where the memory, the transceiver, and the at least one processor are connected to each other by using a line, the at least one memory stores an instruction, and the processor executes the instruction, to perform the indication determining method according to any one of the first aspect or the possible implementations of the first aspect.

According to a tenth aspect, this application provides a chip system, applied to a sending device, including at least one processor, a memory, and an interface circuit, where the memory, the transceiver, and the at least one processor are connected to each other by using a line, the at least one memory stores an instruction, and the processor executes the instruction, to perform the indication determining method according to any one of the second aspect or the possible implementations of the second aspect.

According to an eleventh aspect, this application provides a chip system, applied to a receiving device, including at least one processor, a memory, and an interface circuit, where the memory, the transceiver, and the at least one processor are connected to each other by using a line, the at least one memory stores an instruction, and the processor executes the instruction, to perform the indication method according to any one of the third aspect or the possible implementations of the third aspect.

According to a twelfth aspect, this application provides a chip system, applied to a sending device, including at least one processor, a memory, and an interface circuit, where the memory, the transceiver, and the at least one processor are connected to each other by using a line, the at least one memory stores an instruction, and the processor executes the instruction, to perform the indication method according to any one of the fourth aspect or the possible implementations of the fourth aspect.

According to a thirteenth aspect, this application provides a computer program product including an instruction, where the computer program product stores the instruction, and when the instruction runs on a receiving device, the receiving device is enabled to perform the indication determining method according to the first aspect or any possible design of the first aspect.

According to a fourteenth aspect, this application provides a computer program product including an instruction, where the computer program product stores the instruction, and when the instruction runs on a receiving device, the receiving device is enabled to perform the indication determining method according to the second aspect or any possible design of the second aspect.

According to a fifteenth aspect this application provides a computer program product including an instruction, where the computer program product stores the instruction, and when the instruction runs on a sending device, the sending device is enabled to perform the indication method according to the third aspect or any possible design of the third aspect.

According to a sixteenth aspect, this application provides a computer program product including an instruction, where the computer program product stores the instruction, and when the instruction runs on a sending device, the sending device is enabled to perform the indication method according to the fourth aspect or any possible design of the fourth aspect.

According to a seventeenth aspect, this application provides a communications system, including the receiving device according to any one of the fifth aspect or the possible implementations of the fifth aspect, and the sending device according to any one of the seventh aspect or the possible implementations of the seventh aspect.

According to an eighteenth aspect, this application provides a communications system, including the receiving device according to any one of the sixth aspect or the possible implementations of the sixth aspect, and the sending device according to any one of the eighth aspect or the possible implementations of the eighth aspect.

BRIEF DESCRIPTION OF DRAWINGS

FIG. 7 is a schematic diagram of a slot format according to an embodiment of the present invention;

DESCRIPTION OF EMBODIMENTS

It should be noted that the term "example" or "for example" in this application is used to represent giving an example, an illustration, or a description. Any embodiment or design solution described as an "example" or "for example" in this application should not be explained as being more preferred or having more advantages than another embodiment or design solution. Exactly, use of the term "example" or "for example" is intended to present a concept in a specific manner.

"Of (English: of)", "corresponding (English: corresponding, relevant)", and "corresponding (English corresponding)" may be interchangeably used sometimes in this application. It should be noted that expressed meanings are consistent when differences are not emphasized.

The term "a plurality of" in this application means "two or more than two".

The terms "first", "second", and the like in this application are merely intended to distinguish between different objects, and do not limit their sequence. For example, a first frequency domain resource and a second frequency domain resource are merely intended to distinguish between different frequency domain resources, and do not limit a sequence of the first frequency domain resource and the second frequency domain resource.

Figure 1:
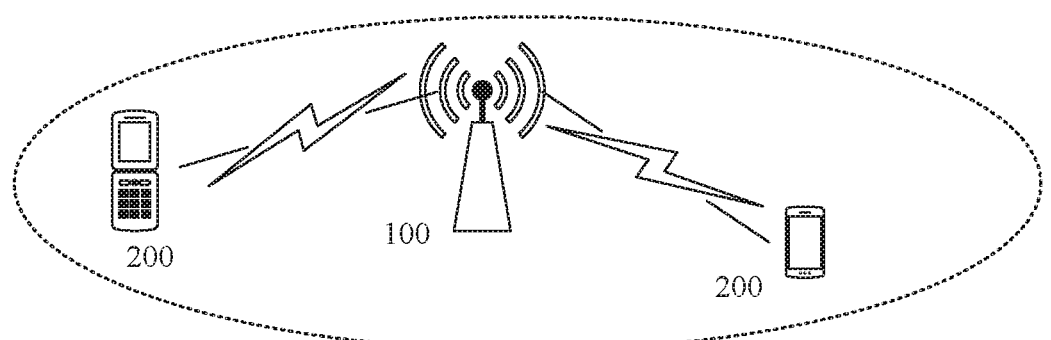
FIG. 1 is a schematic diagram of a communications architecture according to an embodiment of the present invention.

As shown in FIG. 1, FIG. 1 is a schematic architectural diagram of a communications system to which an indication method and an indication determining method are applied according to this application. As shown in FIG. 1, the communications system includes at least one sending device 100 (FIG. 1 shows only one sending device) and one or more receiving devices 200 (FIG. 1 shows only two receiving devices) connected to the sending device 100.

The sending device 100 may be a device configured to communicate with the receiving device 200. The sending device 100 is configured to provide a wireless access service for the receiving device 200. For example, the sending device may be a network device. The sending device 100 may be an access point (access point, AP) in a wireless local area network (Wireless Local Area Network, WLAN), or a base transceiver station (Base Transceiver Station, BTS) in Global System for Mobile Communications (global system for mobile communication, GSM) or Code Division Multiple Access (code division multiple access, CDMA); or may be a NodeB (NodeB, NB) in WCDMA; or may be an evolved NodeB (evolved NodeB, eNB, or eNodeB) in LTE, a relay node or an access point, an in-vehicle device, a wearable device, a network device (for example, a 5G base station (NR NodeB, gNB)) in a future 5G network, or a sending device in a future evolved public land mobile network (public land mobile network, PLMN) network.

In addition, in this embodiment of the present invention, the sending device 100 provides a service for a cell, and the receiving device 200 may communicate with the sending device 100 by using a transmission resource (for example, a frequency domain resource, namely, a spectrum resource) used by the cell. The cell may be a cell corresponding to the sending device 100 (for example, a base station). The cell may belong to a macro base station, or may belong to a base station corresponding to a small cell (small cell). The small cell herein may include a metro cell (Metro cell), a micro cell (Micro cell), a pico cell (Pico cell), a femto cell (Femto cell), and the like. These small cells have features such as small coverage and low transmit power; and are applicable to providing a high-rate data transmission service.

Depending on a used wireless communications technology, a base station may also be referred to as a NodeB (NodeB), an evolved NodeB (evolved NodeB, eNodeB), an access point (Access Point, AP), or the like. In addition, based on a size of a provided service coverage area, base stations may be classified into a macro base station for providing a macro cell (Macro cell), a micro base station for providing a micro cell (Pico cell), a femto base station for providing a femto cell (Femto cell), and the like. With continuous evolution of the wireless communications technologies, a future base station may use another name.

The receiving device 200 may be various wireless communications devices having a wireless communication function, for example, may be user equipment (user equipment, UE), a terminal device, a mobile cellular phone, a cordless phone, a personal digital assistant (Personal Digital Assistant, PDA), a smartphone, a notebook computer, a tablet computer, a wireless data card, a wireless modem (Modulator demodulator, Modem), or a wearable device such as a smartwatch. With emergence of an Internet of Things (Internet of Things, IOT) technology, more devices previously having no communication function, for example, may include but are not limited to a household appliance, a transportation tool, a tool device, a service device, and a service facility start to be configured with a wireless communications unit to obtain a wireless communication function, so that the devices can access a wireless communications network and receive remote control. These devices have the wireless communication function because they are configured with the wireless communications unit. Therefore, these devices also belong to wireless communications devices. In addition, the communications device may be referred to as a mobile station, a mobile device, a mobile terminal, and a wireless terminal. The communications device may be a handheld device having a wireless communication function, a computing device, or another processing device connected to a wireless modem, an in-vehicle device, a wearable device, a terminal in a future 5G network, a terminal in a future evolved PLMN network, or the like.

Before a method provided in the embodiments of this application is described, related terms in this application are first described:

An uplink symbol indicates that a terminal may send uplink transmission to a base station on the uplink symbol.

A downlink symbol indicates that a terminal may receive, on the downlink symbol, downlink transmission sent by a base station.

An unknown resource is a redundant symbol whose symbol function is unknown and is designed to support another service type.

An empty (empty) symbol is also referred to as a spacing symbol, and indicates that no transmission is performed on the symbol. A function of the symbol is an empty resource.

A reserved resource is a resource whose symbol function is "reserved".

Before the solutions provided in this application are described, several scenarios to which the solutions provided in this application are applicable are first described:

With development of a communications system, one slot may need to carry two or more pieces of indication information to indicate slot formats. To be specific, a slot format of a current slot needs to be indicated in a current slot, and when slot formats of one or more slots after the current slot also need to be indicated in the current slot, there is a case in which two slot formats are indicated in one slot. In this case, it is required to indicate, specify, or determine in at least two slot formats, which slot format is specific to the current slot, and which slot format is specific to the one or more slots after the current slot. For example, in Scenario 1, a previous slot format of the current slot is a slot format in which all symbols are uplink symbols or a function of a symbol that is used to carry slot format indication information is an "unknown resource" in the previous slot format; in Scenario 2, the current slot is the first slot after a terminal accesses a base station; and in Scenario 3, a slot format of a next slot of the current slot is a slot format in which all symbols are uplink symbols or a function of a symbol that is used to carry a slot format is an "unknown resource" in the slot format. In Scenario 3, the slot format of the current slot cannot be indicated inside the current slot. In addition, Scenario 4 is included: To support flexible scheduling, a slot format previously configured for the current slot may be reconfigured subsequently. Therefore, a terminal needs to identify whether a reconfigured slot format is specific to the current slot or a next slot of the current slot.

Figure 2:
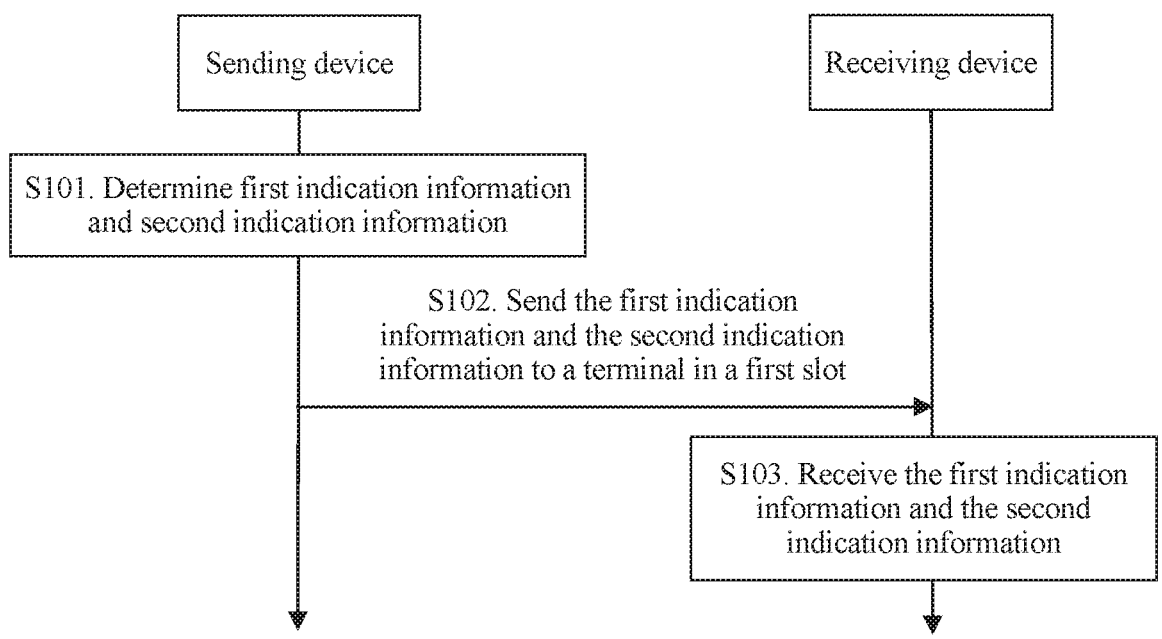
FIG. 2 is a first schematic flowchart of an indication method according to an embodiment of the present invention.

A method provided in this application is described in detail below by using an example in which a receiving device is a terminal, and a sending device is a base station:

As shown in FIG. 2, this application provides an indication determining method, including the following steps.

A base station determines first indication information and second indication information, where the first indication information indicates a slot format of a first slot (Slot), the second indication information indicates a slot format of a second slot, and the second slot is a slot after the first slot.

Optionally, there is an association relationship between a slot format indicated by indication information and the indication information. For example, in this application, there is an association relationship between the slot format indicated by the first indication information and the first indication information, and there is an association relationship between the slot format indicated by the second indication information and the second indication information.

In an implementation, the base station configures the association relationship between a slot format indicated by indication information and the indication information, and sends the association relationship to a terminal. Optionally, that the base station configures the association relationship between a slot format indicated by indication information and the indication information, and sends the association relationship to the terminal may be specifically performed before or in the following S102. Therefore, after receiving the indication information, the terminal may determine a slot format indicated by each piece of indication information.

Optionally, the first slot may be a slot, for example, a current slot, in which the base station and the terminal currently communicate with each other in a current scheduling period.

Figure 3:
FIG. 3 is a schematic diagram of a slot format.

Optionally, the second slot in this application may be one or more slots after the first slot (for example, a slot 1 shown in FIG. 3). As shown in FIG. 3, the second slot may be a slot 2, a slot 3, and a slot 4 shown in FIG. 3.

It may be understood that when the second slot is a plurality of slots after the first slot, the second indication information is used to indicate a slot format of each of the plurality of slots. In this case, the second indication information may indicate a first slot format, and the first slot format indicated by the second indication information is used for each of the plurality of slots.

In a possible implementation, the second slot may be adjacent to the first slot. In another possible implementation, the second slot and the first slot may be separated by one or more slots. For example, as shown in FIG. 3, the first slot is the slot 1, and the second slot may be the slot 4. This is not limited in this application.

In this application, both the first indication information and the second indication information are information that carries a slot format. In an actual process, the information that carries a slot format may be usually referred to as a slot format indicator (slot format indication, SFI). In other words, the first indication information may be a first SFI, and the second indication information may be a second SFI.

In a possible implementation, a slot format allocated by the base station to the first slot and a slot format allocated to the second slot may be selected from several existing common structures. For example, a slot format may have the following structure: the first three symbols are downlink symbols, two symbols following the downlink symbols are empty symbols, four symbols following the empty symbols are uplink symbols, three symbols following the uplink symbols are symbols whose uses are unknown, and the last two symbols are uplink symbols. Alternatively, a slot format may be a slot format 1 in which all symbols are uplink symbols (14 symbols are all uplink symbols), a slot format 2 in which all symbols are downlink symbols (in other words, 14 symbols are all downlink symbols), or a slot format 3 in which some symbols are downlink symbols and the other symbols are uplink symbols (in other words, some symbols are downlink symbols, and the other symbols are uplink symbols). For example, the base station may indicate, by using the first indication information, that the slot format of the first slot is the slot format 2; and the base station may indicate, by using the second indication information, that the slot format of the second slot is the slot format 1.

In another possible implementation, the base station may allocate, based on a requirement of data transmission between the base station and the terminal or another factor such as switching between different service types, slot formats that can meet a communication requirement to the first slot and the second slot of the terminal. For example, a slot format 4 may be configured as 01011110111101, where 0 represents a downlink symbol, and 1 represents an uplink symbol; and a slot format 5 may be configured as 10000010000001. Then, the first indication information is used to indicate that the slot format of the first slot is the slot format 4, and that the second indication information is used to indicate that the slot format of the second slot is 5.

S102. The base station sends the first indication information and the second indication information to a terminal in the first slot.

Optionally, the base station may send the first indication information and the second indication information to the terminal in an information broadcast manner by using control information.

It may be understood that when the base station sends the first indication information and the second indication information to the terminal in the information broadcast manner, the control information may further carry identification information of the terminal. Therefore, after receiving the first indication information and the second indication information that are carried in the control information, the terminal may determine, based on the identification information, whether the first indication information and the second indication information are sent to the terminal. The identification information of the terminal is used to identify the terminal, and is not limited in this application.

Figure 4:
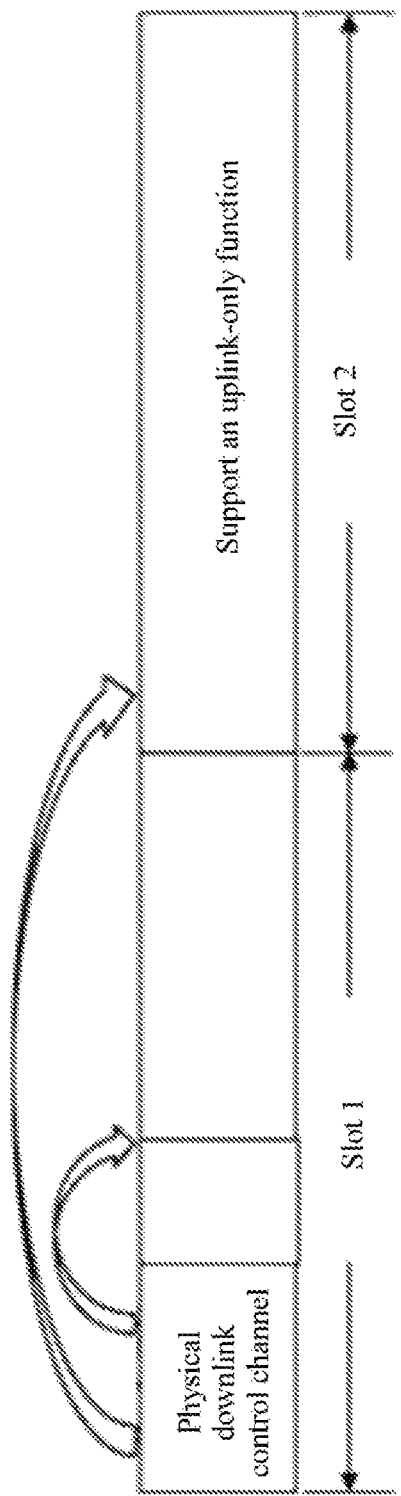
FIG. 4 is a schematic diagram of a structure in which slot formats are configured for two slots in one slot according to an embodiment of the present invention.

Optionally, as shown in FIG. 4, the base station may send the first indication information and the second indication information to the terminal in a control information area (for example, a PDCCH or a GC-PDCCH) of the first slot.

It may be understood that in this embodiment of this application, S101 is an optional implementation, and S101 may be omitted in a specific implementation process. When S101 is omitted, the first indication information sent by the base station to the terminal in the first slot indicates the slot format of the first slot (Slot), the second indication information indicates the slot format of the second slot, and the second slot is a slot after the first slot.

S103. The terminal receives, in the first slot, the first indication information and the second indication information that are sent by the base station.

According to the indication determining method provided in this embodiment of the present invention, a receiving device receives, in the first slot, the first indication information and the second indication information that are sent by a sending device. Indication information allocated to two different slots is carried in one slot, so that the receiving device may determine the slot format of the first slot based on the first indication information and determine the slot format of the second slot based on the second indication information. In this way, the receiving device may perform uplink transmission or downlink receiving with the sending device in the first slot based on the determined slot format of the first slot. In addition, the receiving device may determine a slot format of a slot after the first slot. Therefore, when performing scheduling in the second slot, the receiving device performs uplink transmission or downlink receiving with the sending device in the second slot. In comparison with a conventional technical solution in which one slot can carry indication information of only one slot format, in this application, not only the slot format of the first slot may be indicated, but also the slot format of the slot after the first slot may be indicated when the first one to three symbols of the slot (for example, the second slot) after the first slot cannot be used to carry the second indication information. In addition, in this application, the slot format indicated by the first indication information and the slot format indicated by the second indication information may be the same or different, so that the receiving device performs uplink transmission and downlink receiving with the sending device in two different slots based on different slot formats.

Figure 5:
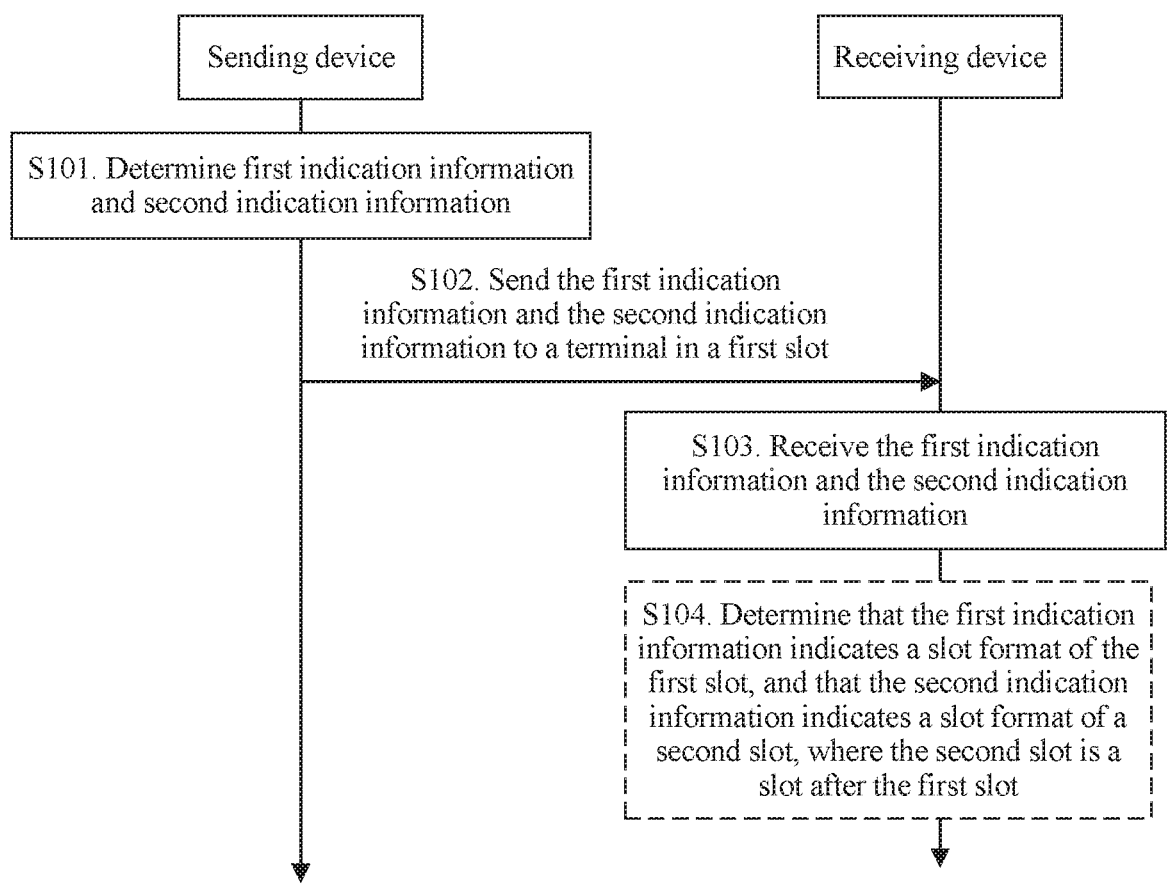
FIG. 5 is a second schematic flowchart of an indication method according to an embodiment of the present invention.

Optionally, in the solution provided in this embodiment of the present invention, as shown in FIG. 5, after the terminal performs S103, the method may further include the following step:

S104. The terminal determines the slot format of the first slot based on the first indication information, and determines the slot format of the second slot based on the second indication information.

In an actual process, the base station may explicitly or implicitly notify the terminal which indication information is used to indicate a slot format of which slot, and different indication manners used by the base station results in different manners in which the terminal determines the slot format of the first slot and the slot format of the second slot. Therefore, detailed descriptions are given below with reference to the following embodiment.

Figure 6:
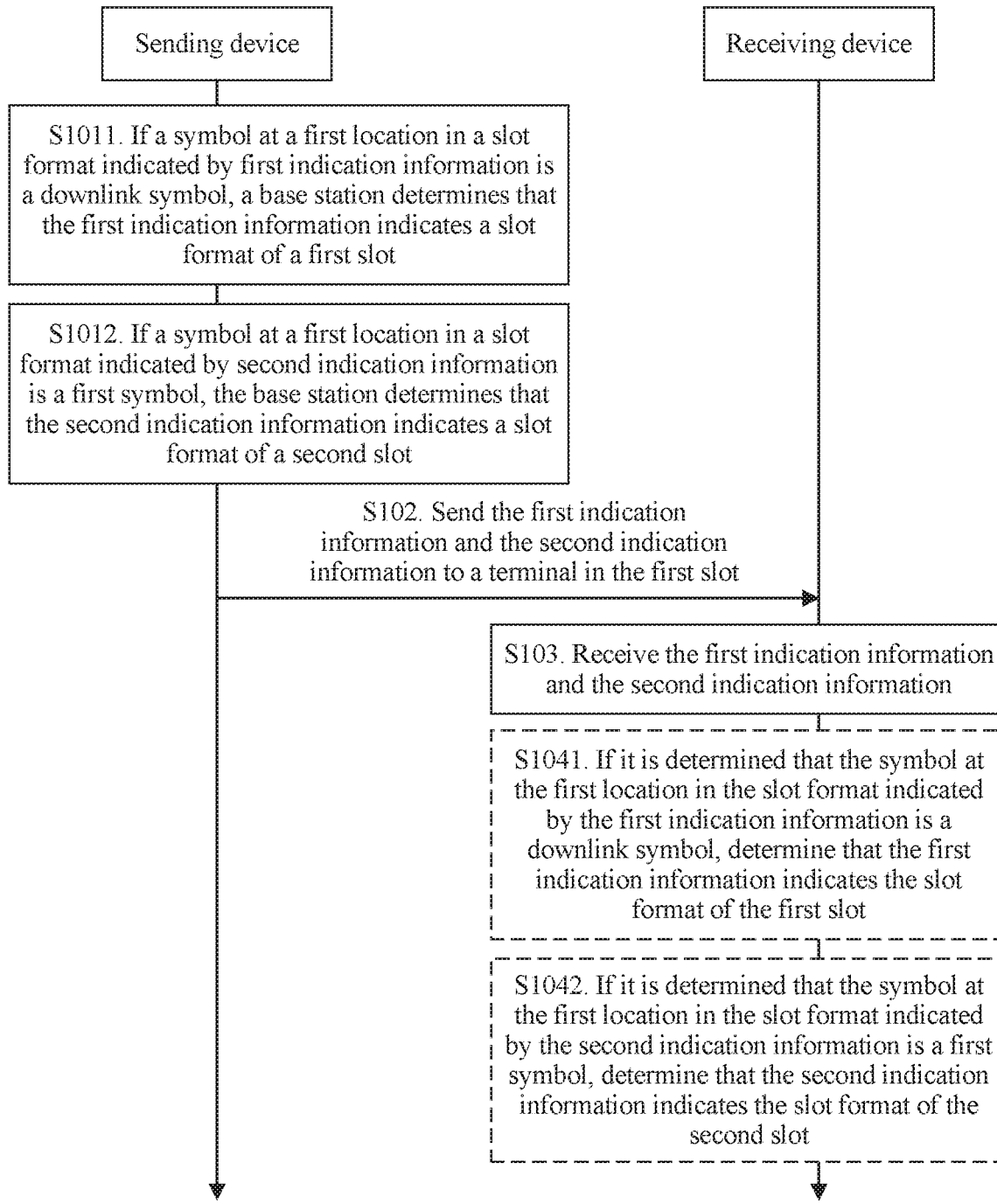
FIG. 6 is a third schematic flowchart of an indication method according to an embodiment of the present invention.

In an implementation 1 of this application, as shown in FIG. 6, step S101 in this application may be implemented in the following manner:

S1011. If a symbol at a first location in the slot format indicated by the first indication information is a downlink symbol, the base station determines that the first indication information indicates the slot format of the first slot.

As shown in FIG. 7, FIG. 7 shows a structure of a slot format. In 14 symbols included in a slot format, it may be considered that each of the 14 symbols has a location in the slot format. As shown in FIG. 7, symbols at all locations may be numbered from left to right, for example, a symbol 0, a symbol 1, a symbol 2, . . . , and a symbol 13. The symbol 0 may also be referred to as an initial symbol, and the symbol 13 may also be referred to as an end symbol.

In addition, usually only the first one to three symbols in 14 symbols included in a slot format may be used to carry indication information that indicates a slot format, for example, the symbol 0, the symbol 1, and the symbol 2 shown in FIG. 7. Therefore, a symbol at a first location in this application may be any one of the first one to three symbols in a slot format.

It may be understood that with development of a communications system, when symbols in a slot format that are used to carry indication information used to indicate a slot format are not merely limited to the first one to three symbols, for example, may be subsequent four to 13 symbols, the symbol at the first location in this application may also be any one of the subsequent four to 13 symbols.

S1012. If a symbol at a first location in the slot format indicated by the second indication information is a first symbol, the base station determines that the second indication information indicates the slot format of the second slot, where a function of the first symbol is different from a function of the downlink symbol.

Optionally, the first symbol in this application is a symbol that cannot carry slot format information. For example, the function of the first symbol may be any one of uplink transmission, a reserved resource, an empty resource, and a spacing symbol.

When the base station notifies the terminal of the slot format of the first slot and the slot format of the second slot by using the implementation 1, as shown in FIG. 6, step S104 in this application may be implemented in the following manner:

S1041. If the terminal determines that the symbol at the first location in the slot format indicated by the first indication information is a downlink symbol, the terminal determines that the first indication information indicates the slot format of the first slot.

For determining of the symbol at the first location, refer to the description in the foregoing embodiment. This is not limited in this application.

S1042. If the terminal determines that the symbol at the first location in the slot format indicated by the second indication information is a first symbol, the terminal determines that the second indication information indicates the slot format of the second slot.

Indication information is usually carried on a PDCCH, and is transmitted on a downlink symbol occupied in a slot format of a current slot. Therefore, a slot format in which a symbol at a first location is a downlink symbol is usually determined as the slot format of the first slot, and a slot format in which a symbol at a first location is not a downlink symbol is determined as a slot format of a next slot of the current slot or a slot format of a slot after the current slot.

Figure 8:
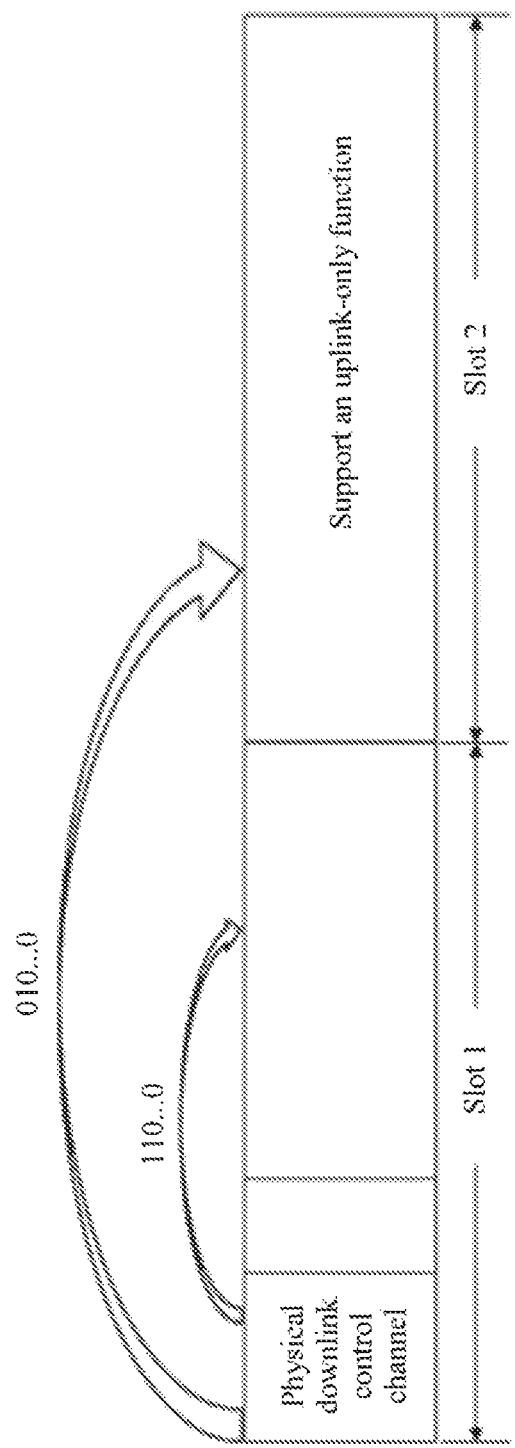
FIG. 8 is a first schematic diagram in which a slot format is configured according to an embodiment of the present invention.

For example, as shown in FIG. 8, the first slot is a slot 1, and the second slot is a slot 2. The terminal obtains, through decoding on a control channel (for example, a PDCCH) that carries the first indication information and the second indication information, slot formats indicated by the two pieces of indication information, namely, the first indication information and the second indication information. The slot format indicated by the first indication information is "110 . . . 0", and an initial symbol in the slot format "110 . . . 0" is a downlink symbol. The slot format indicated by the second indication information is "010 . . . 0", and an initial symbol in the slot format "010 . . . 0" is a non-downlink symbol. For example, a function of the non-downlink symbol is any one of uplink transmission, an unknown resource, a spacing symbol, a reserved resource, or an empty resource. In this case, the slot 1, namely, the first slot, needs to support downlink transmission, to determine the slot format of the slot 1. Therefore, the terminal determines that the slot format of the first slot is "110 . . . 0", and the slot format of the slot 2, namely, the second slot, is "010 . . . 0". It may be understood that this application is described by using an initial symbol as an example, and in an actual process, a symbol that carries indication information may also be a second symbol or a third symbol.

It may be understood that in an actual process, the base station and the terminal may further agree on that when the symbol at the first location in the slot format indicated by the first indication information and the symbol at the first location in the slot format indicated by the second indication information both are downlink symbols, the slot format of the first slot and the slot format of the second slot may be further determined in the following manner:

In one aspect, when all symbols at first locations in slot formats indicated by two or more pieces of indication information are downlink symbols, the terminal may determine the slot format of the first slot and the slot format of the second slot based on resources on which control channels that carry the two or more pieces of indication information is located.

For example, a first slot format is "110 . . . 0", and a second slot format is "111 . . . 0". A control channel that carries the first slot format is located on a resource 1, and a control channel that carries the second slot format is located on a resource 2. Therefore, based on a rule agreed on by the base station and the terminal, the first slot format may be determined as the slot format of the first slot, and the second slot format may be determined as the slot format of the second slot.

In another aspect, when all symbols at first locations in slot formats indicated by two or more pieces of indication information are downlink symbols, the terminal may determine the slot format of the first slot and the slot format of the second slot based on another symbol that may be used to carry indication information. Usually, the terminal uses, as the slot format of the first slot, a slot format that is indicated by indication information and in which an initial symbol is a downlink symbol. Therefore, when all initial symbols in slot formats indicated by the two or more pieces of indication information are downlink symbols, the terminal may use, as the slot format of the first slot, a slot format in which a second symbol is a downlink symbol, and so on.

For example, a first slot format is "110 . . . 0", and a second slot format is "101 . . . 0". in this case, the terminal may determine that the slot format of the first slot is "110 . . . 0", and that the slot format of the second slot is "101 . . . 0".

Figure 9:
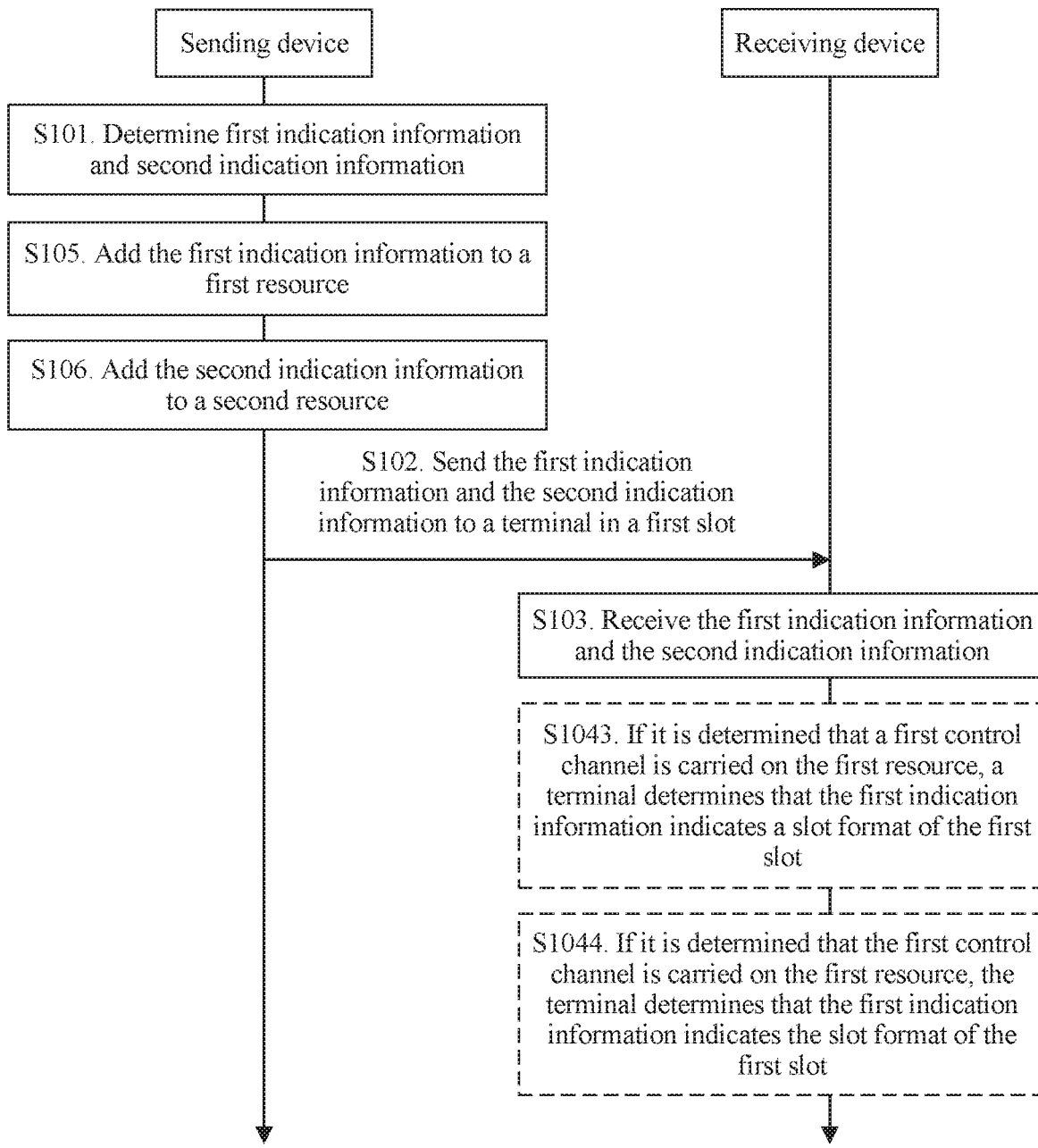
FIG. 9 is a fourth schematic flowchart of an indication method according to an embodiment of the present invention.

In another possible implementation 2 of this application, as shown in FIG. 9, before step S102, the method provided in this application further includes the following steps:

S105. The base station adds the first indication information to a first resource, where the first resource is used to carry the slot format of the first slot, and a second resource is used to carry the slot format of the second slot.

S106. The base station adds the second indication information to the second resource, where the first resource and the second resource are different.

Optionally, step S103 in this application may be specifically implemented in the following manner:

The terminal receives the first indication information on the first resource, the terminal receives the second indication information on the second resource, and the first resource and the second resource are different.

Optionally, the first resource and the second resource meet any one of the following conditions: the first resource is a first frequency domain resource, and the second resource is a second frequency domain resource; the first resource is a first time domain resource, and the second resource is a second time domain resource; the first resource is a first control resource set, and the second resource is a second control resource set; or the first resource is a first control channel, and the second resource is a second control channel.

Optionally, the first control channel and the second control channel may be group-common physical downlink control channels (Group-common physical downlink control channel, GC-PDCCH) or physical downlink control channels (Physical downlink control channel, PDCCH).

In addition, when the base station sends the first indication information and the second indication information to the terminal on a PDCCH in step S102, the terminal may receive the first indication information and the second indication information on the PDCCH. When the base station sends the first indication information and the second indication information to the terminal on a GC-PDCCH in step S102, the terminal may receive the first indication information and the second indication information on the GC-PDCCH.

Optionally, in a possible implementation, the first resource and the second resource meet at least one of the following conditions:

A time domain location of the first time domain resource is different from a time domain location of the second time domain resource; a resource identifier of the first control resource set is different from a resource identifier of the second control resource set; a parameter of the first frequency domain resource is different from a parameter of the second frequency domain resource; and a number of the first control channel is different from a number of the second control channel.

That the time domain location of the first resource is different from the time domain location of the second resource may mean that there is a sequence of the time domain location of the first resource and the time domain position of the second resource.

The resource identifier of the first control resource set is used to identify the first control resource set, and the resource identifier of the second control resource set is used to identify a resource in the second control resource set.

A number, an index (Index), or a CORESET location of a control resource set (Control resource set, CORESET) is a CORESET number of a control channel. (The CORESET is one or more preset resources that may carry control information. A resource that carries a PDCCH is a control resource set. There may be a plurality of control resource sets in one slot, each control resource set has a corresponding number or location, and locations of the control resource sets are configured by using higher layer signaling (RRC signaling or MAC signaling) sent by the base station.) For example, a slot format indicated by indication information in a CORESET whose number is smaller in CORESETs in which control channels that carry indication information are located may be determined as the slot format of the first slot, and a slot format indicated by indication information in a CORESET whose number is larger in the CORESETs in which the control channels are located may be determined as the slot format of the second slot. Alternatively, a slot format indicated by indication information in a CORESET whose number is larger in CORESETs in which control channels are located may be determined as the slot format of the first slot, and a slot format indicated by indication information in a CORESET whose number is smaller in the CORESETs in which the control channels are located may be determined as the slot format of the second slot. It may be understood that a large number and a small number herein may be a relative concept between frequency domain resources on which two control channels are located.

Figure 10:
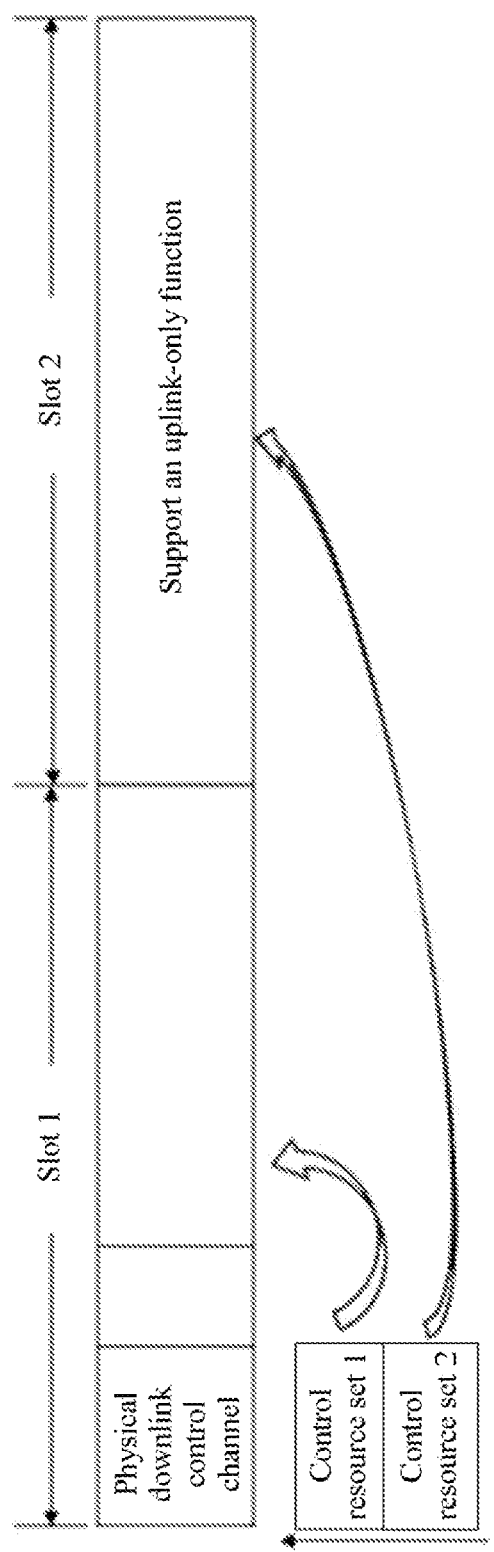
FIG. 10 is a second schematic diagram in which a slot format is configured according to an embodiment of the present invention.

As shown in FIG. 10, a slot format indicated by indication information (for example, the first indication information) carried in a CORESET 1 may be used as the slot format of the first slot, and a slot format indicated by indication information (for example, the second indication information) carried in a CORESET 2 is used as the slot format of the second slot.

The parameter of the first frequency domain resource and the parameter of the second frequency domain resource may be locations of the frequency domain resources in frequency domain. For example, a slot format indicated by indication information on a frequency domain resource that has a larger parameter in frequency domain resources on which control channels that carry control information are located may be used as the slot format of the first slot, and a slot format indicated by indication information on a frequency domain resource that has a smaller parameter in the frequency domain resources on which the control channels that carry control information are located may be used as the slot format of the second slot. Alternatively, a slot format indicated by indication information on a frequency domain resource that has a smaller parameter in frequency domain resources on which control channels that carry control information are located may be used as the slot format of the first slot, and a slot format indicated by indication information on a frequency domain resource that has a larger parameter in the frequency domain resources on which the control channels that carry control information are located may be used as the slot format of the second slot. It may be understood that a large parameter and a small parameter herein may be a relative concept between frequency domain resources on which two control channels are located.

When the base station notifies the terminal of the slot format of the first slot and the slot format of the second slot by using the implementation 2, in another possible implementation, as shown in FIG. 9, step S104 in this application may be implemented in the following manner:

S1043. The terminal determines, as the slot format of the first slot, the slot format indicated by the first indication information received on the first resource.

S1044. The terminal determines; as the slot format of the second slot, the slot format indicated by the second indication information received on the second resource.

For example, before determining that a time domain location of a first control channel that carries the first indication information is before a time domain location of a second control channel that carries the second indication information, the terminal determines that the first indication information indicates the slot format of the first slot, and that the second indication information indicates the slot format of the second slot; or after determining that a time domain location of a first control channel that carries the first indication information is after a time domain location of a second control channel that carries the second indication information, the terminal determines that the first indication information indicates the slot format of the first slot, and that the second indication information indicates the slot format of the second slot. This is not limited in this application.

Alternatively, if the terminal determines that a resource number of a first control channel that carries the first indication information is less than a resource number of a second control channel that carries the second indication information, the terminal determines that the first indication information indicates the slot format of the first slot, and that the second indication information indicates the slot format of the second slot; or if the terminal determines that a resource number of a first control channel that carries the first indication information is greater than a resource number of a second control channel that carries the second indication information, the terminal determines that the first indication information indicates the slot format of the first slot, and that the second indication information indicates the slot format of the second slot.

For example, if the terminal determines that a number of a first control resource set in which the first indication information is located is less than a number of a second control resource set in Which the second indication information is located, the terminal determines that the first indication information indicates the slot format of the first slot, and that the second indication information indicates the slot format of the second slot; or if the terminal determines that a number of a first control resource set in which the first indication information is located is greater than a number of a second control resource set in which the second indication information is located, the terminal determines that the first indication information indicates the slot format of the first slot, and that the second indication information indicates the slot format of the second slot.

It may be understood that the terminal device may negotiate with the base station for or may be notified by the base station of whether the terminal specifically uses, as the slot format of the first slot, a slot format indicated by indication information carried on a control channel whose time domain location is before that of the other control channel or a slot format indicated by indication information carried on the other control channel; or uses, as the slot format of the first slot, a slot format indicated by indication information in a control resource set with a larger resource number or a slot format indicated by indication information in a control resource set with a smaller resource number. This is not limited in this application.

In an optional manner, the base station in this application may further notify the terminal of a relationship between the first resource and the first slot and a relationship between the second resource and the second slot. In this way, provided that the terminal obtains; from the first resource, a control channel that carries indication information, the terminal uses, as the slot format of the first slot, a slot format that is indicated by the indication information carried on the control channel obtained from the first resource, and uses, as the slot format of the second slot, a slot format that is indicated by indication information carried on a control channel obtained in the second slot.

Figure 11:
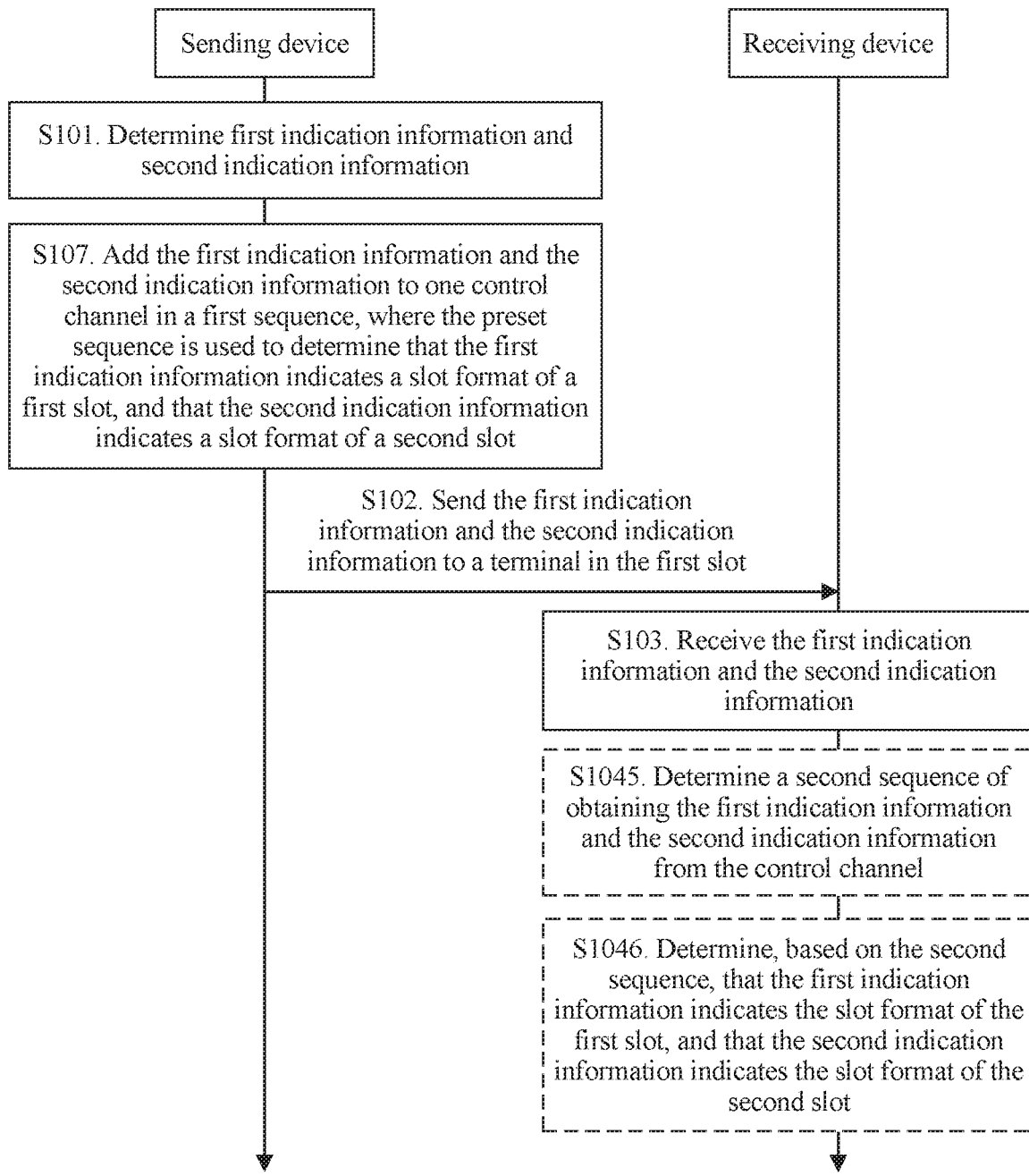
FIG. 11 is a fifth schematic flowchart of an indication method according to an embodiment of the present invention.

In still another implementation 3 of this application, as shown in FIG. 11, before step S102, this application further includes the following step:

S107, The base station adds the first indication information and the second indication information to one control channel in a first sequence, where the first sequence is used to determine that the first indication information indicates the slot format of the first slot, and that the second indication information indicates the slot format of the second slot.

Optionally, the first sequence in this application may be that the first indication information is before the second indication information, or the second indication information is before the first indication information. This is not limited in this application. The base station may notify the terminal of the first sequence after determining the first sequence in which the indication information is carried on the control channel; or the base station negotiates with the terminal for the first sequence; or the base station preconfigures, for the terminal, that encoding is performed in the first sequence in which the first indication information is before the second indication information.

Specifically, the base station encodes the first indication information and the second indication information on one control channel in the first sequence.

Figure 12:
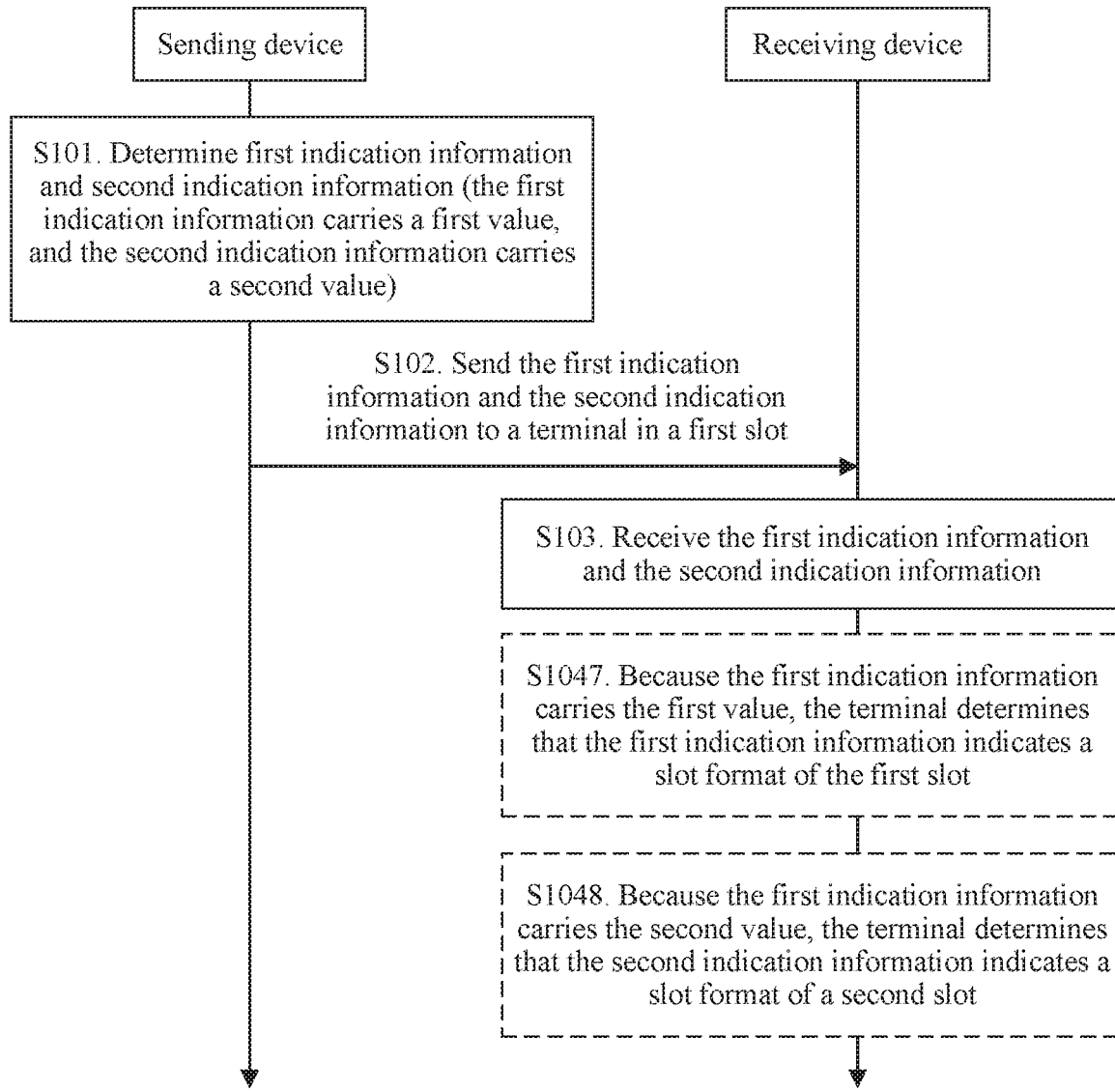
FIG. 12 is a sixth schematic flowchart of an indication method according to an embodiment of the present invention.

When the base station notifies the terminal of the slot format of the first slot and the slot format of the second slot by using the implementation 3, in another possible implementation, as shown in FIG. 12, step S104 in this application may be implemented in the following manner:

S1045. The terminal determines a second sequence of obtaining the first indication information and the second indication information from the control channel, where the second sequence is used to determine that the first indication information indicates the slot format of the first slot, and that the second indication information indicates the slot format of the second slot.

Optionally, the control channel may be a GC-PDCCH or a PDCCH.

S1046. The terminal determines, based on the second sequence, that the first indication information indicates the slot format of the first slot, and that the second indication information indicates the slot format of the second slot.

For example, the terminal receives a GC-PDCCH sent by the base station, and decodes the GC-PDCCH to sequentially obtain two pieces of indication information. The terminal determines, based on a second sequence obtained through decoding, a sequence of slots corresponding to the indication information. For example, a slot format indicated by indication information that is earlier obtained through decoding is specific to the first slot, and a slot format indicated by indication information that is later obtained through decoding is specific to the second slot. Optionally, the first sequence and the second sequence may be the same, or the second sequence may be the first sequence in reverse.

Optionally, step S1046 may be specifically implemented in the following manner: The terminal determines that the first indication information is ranked before the second indication information on the control channel, and the terminal determines that the first indication information indicates the slot format of the first slot, and that the second indication information indicates the slot format of the second slot.

Alternatively, step S1046 may be specifically implemented in the following manner:

The terminal determines that the first indication information is ranked after the second indication information on the control channel, and the terminal determines that the first indication information indicates the slot format of the first slot, and that the second indication information indicates the slot format of the second slot.

It may be understood that specifically, the base station needs to negotiate with the terminal for whether the terminal uses, as the slot format of the first slot, a slot format indicated by indication information ranked before the other indication information, or uses, as the slot format of the second slot, a slot format indicated by the other indication information. To be specific, the terminal needs to determine a sequence in which the base station encodes the first indication information and the second indication information on the control channel, and determines the slot format of the first slot and the slot format of the second slot based on the encoding sequence. For example, a slot format indicated by indication information that is first encoded on the control channel is used as the slot format of the first slot, and a slot format indicated by indication information that is encoded following the first encoded indication information on the control channel is used as the slot format of the second slot. Usually, earlier encoded indication information is later decoded in a decoding process. Therefore, the terminal may use, as the slot format of the first slot, a slot format indicated by indication information that is finally obtained through decoding; and use, as the slot format of the second slot, a slot format indicated by indication information that is obtained through decoding before the indication information finally obtained through decoding.

In yet another implementation 4 of this application, as shown in FIG. 12, the base station in this application may further add a parameter to each piece of indication information, and use the parameter carried in each piece of indication information to indicate the slot format of the first slot and the slot format of the second slot.

Optionally, the first indication information carries a first value, and the first value is used to determine that the first indication information indicates the slot format of the first slot. The second indication information carries a second value, and the second value is used to determine that the second indication information indicates the slot format of the second slot.

In a possible implementation, the first value in this application may be carried on at least one bit in the first indication information, and the second value may be carried on at least one bit in the second indication information.

Optionally, a location of the at least one bit in the first indication information and a location of the at least one bit in the second indication information are a same location.

For example, one or more hits at an end of each piece of indication information are used to carry the first value or the second value.

In a possible implementation, the first value and the second value are different.

Optionally, the first value may be 1 or 11, and the second value may be 0 (corresponding to 1 bit) or 00 (corresponding to 2 bits). In this application, the first value may be carried by using at least one additional bit in the first indication information, and the second value may be carried by using at least one additional bit in the second indication information. Usually, a location of the at least one additional bit in the first indication information is the same as a location of the at least one additional bit in the second indication information. To reduce signaling overheads, one bit is usually used for indication in this application.

When the base station notifies the terminal of the slot format of the first slot and the slot format of the second slot by using the implementation 4, in another possible implementation, as shown in FIG. 12, step S104 in this application may be implemented in the following manner:

S1047. If the first indication information carries a first value, the terminal determines that the first indication information indicates the slot format of the first slot.

S1048. If the second indication information carries a second value, the terminal determines that the second indication information indicates the slot format of the second slot.

In a possible implementation, the first value and the second value are different in this application.

Figure 13:
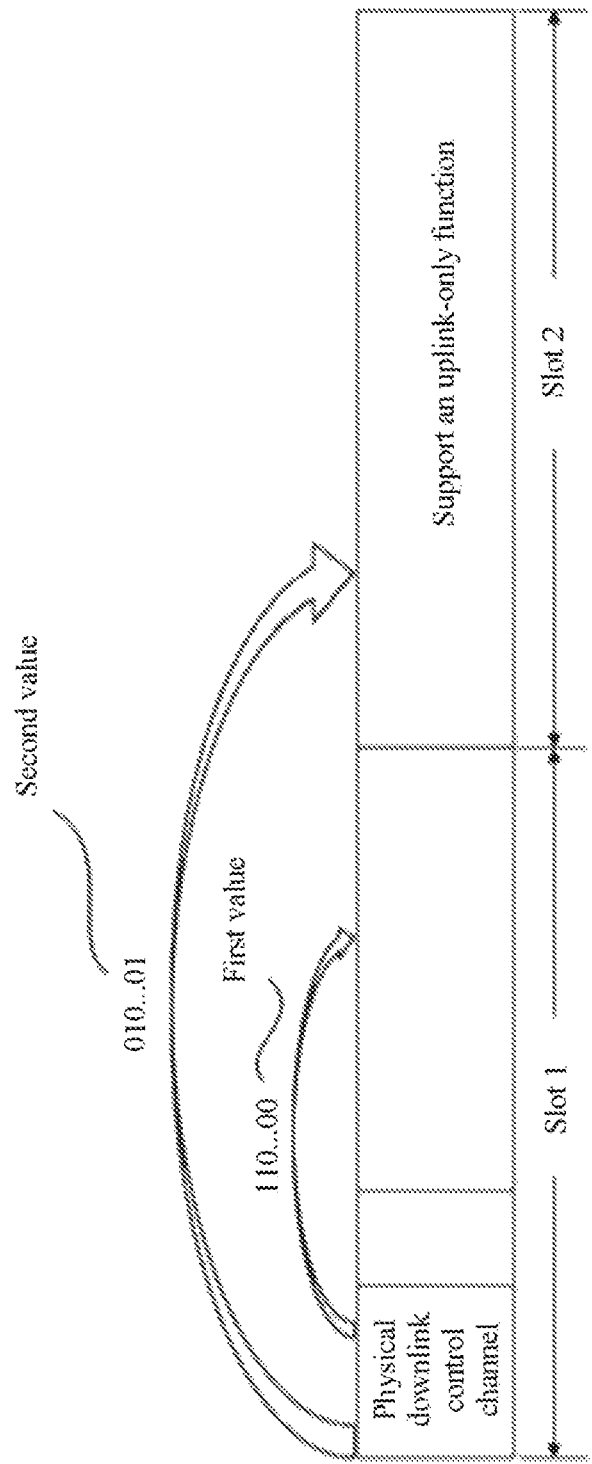
FIG. 13 is a third schematic diagram in which a slot format is configured according to an embodiment of the present invention.

As shown in FIG. 13, the base station sends two pieces of indication information. The first indication information is "010 . . . 0" (it may be understood that in FIG. 13, one additional hit, other than 14 symbols that indicate a slot format, that is carried at an end of each piece of indication information indicates a specific slot corresponding to the indication information), and the first value of the first indication information is 0. The second indication information is "110 . . . 0", and the second value of the second indication information is 1. The "010 . . . 0" whose first value is 0 is the slot format of the first slot, and the "110 . . . 0" whose second value is 1 is the slot format of the second slot. It may be understood that in this application, that the first value is 0 and the second value is 1 is only used as an example for description, and in an actual process, the first value may be 1, and the second value may be 0.

Figure 14:
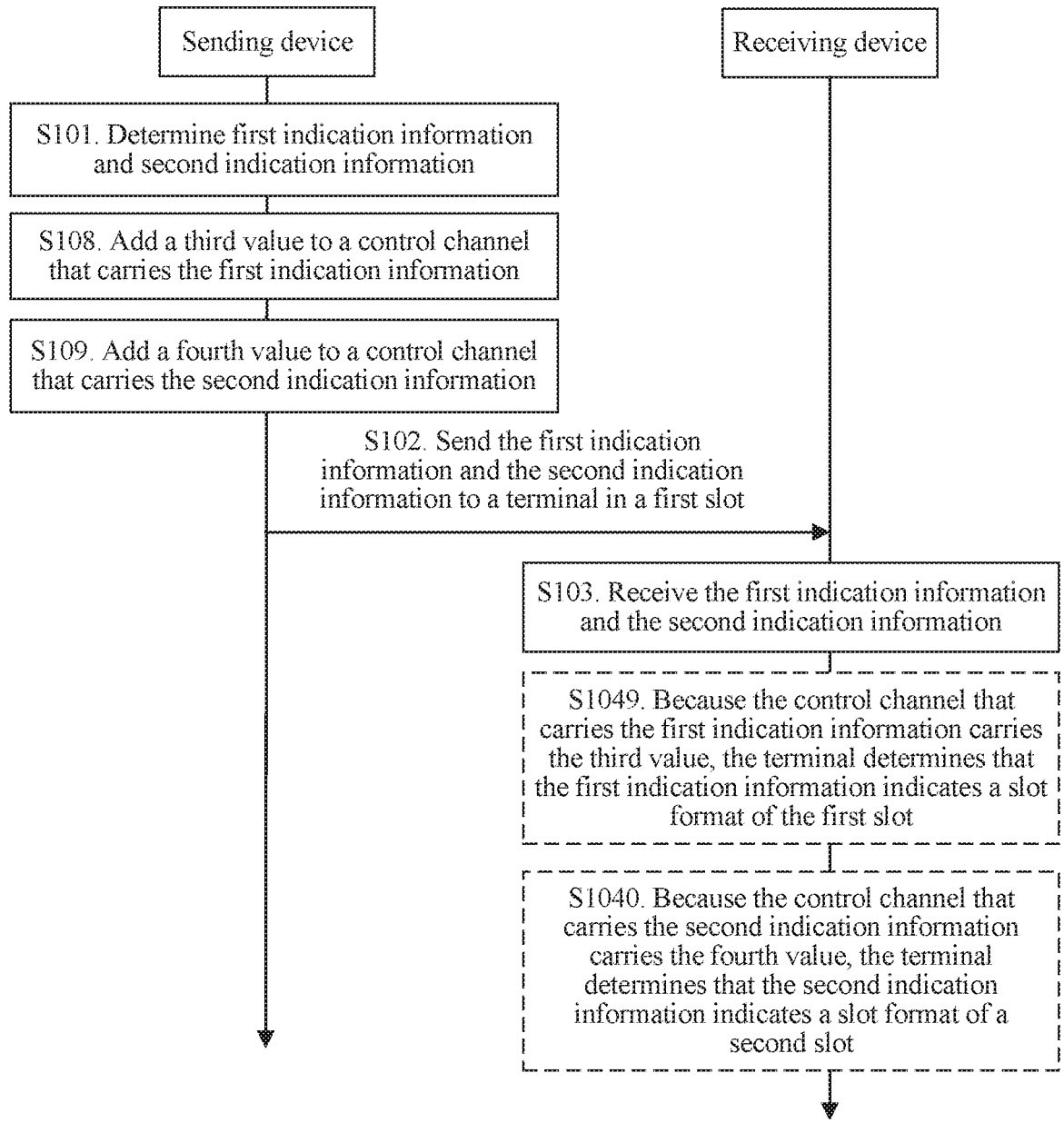
FIG. 14 is a seventh schematic flowchart of an indication method according to an embodiment of the present invention.

In still yet another implementation 5 of this application, the base station in this application may further add a parameter to a control channel that carries each piece of indication information, and use the parameter to indicate a slot format that is of a specific slot and that is indicated by indication information carried on the control channel. Therefore, in the method provided in this application, as shown in FIG. 14, before step S102, the method further includes the following steps:

S108. The base station adds a third value to a control channel that carries the first indication information, where the third value is used to determine that the first indication information indicates the slot format of the first slot.

S109. The base station adds a fourth value to a control channel that carries the second indication information, where the fourth value is used to determine that the second indication information indicates the slot format of the second slot.

In a possible implementation, the third value in this application may be carried on at least one bit on the control channel that carries the first indication information, and the fourth value may be carried on at least one bit on the control channel that carries the second indication information.

Optionally, a location of the at least one bit on the control channel that carries the first indication information and a location of the at least one bit on the control channel that carries the second indication information are a same location.

For example, one or more bits at an end of the control channel that carries the first indication information are used to carry the third value or the fourth value.

In a possible implementation, the third value and the fourth value are different in this application. For example, the third value may be 1, and the fourth value may be 0.

When the base station notifies the terminal of the slot format of the first slot and the slot format of the second slot by using the implementation 5, in another possible implementation, as shown in FIG. 14, step S104 in this application may be implemented in the following manner:

S1049. Because the control channel that carries the first indication information carries the third value, the terminal determines that the first indication information indicates the slot format of the first slot.

S1040. Because the control channel that carries the second indication information carries the fourth value, the terminal determines that the second indication information indicates the slot format of the second slot, where the third value and the fourth value are different.

Specifically, for specific implementations of steps S108 and S109, refer to the foregoing steps S106 and S107. Details are not described herein again in this application.

It should be noted that when the base station may notify the terminal of the slot format of the first slot and the slot format of the second slot by using the implementation 1 to the implementation 5, any two or more of the implementation 1 to the implementation 5 may coexist. In this way, when all symbols at first locations of two or more pieces of indication information are used to carry indication information, another implementation may be used as a basis for determining a slot format corresponding to a slot combination. Details are not described herein in this application.

Optionally, in the foregoing embodiment, the method provided in this application further includes the following step:

S110. The base station sends fourth indication information to the terminal, to indicate N repetition times of the slot format of the first slot and the slot format of the second slot, M repetition times of the slot format of the first slot, P repetition times of the slot format of the second slot, or N repetition times of the slot format of the first slot and M repetition times of the slot format of the second slot, where N is an integer greater than or equal to 2, M is an integer greater than or equal to 2, and P is an integer greater than or equal to 2. Therefore, the method in this application further includes the following step:

S111. The terminal uses the slot format of the first slot and the slot format of the second slot as slot formats of each slot in N different slot combinations (a slot combination includes the first slot and the second slot) based on a quantity of repetition times each of the slot format of the first slot and the slot format of the second slot; or uses the slot format of the first slot as a slot format of each of M slots based on a quantity of repetition times of the first slot, and then uses the slot format of the second slot as a slot format of an $(M+1)^{th}$ slot; or after using the slot format of the first slot as the slot format of the first slot, uses, as a slot format of each of P different slots, the slot format of the second slot that is repeated for P times; or uses the slot format of the first slot as a slot format of each of N different slots (including the first slot), and then uses the slot format of the second slot as a slot format of each of M different slots (the M different slots include the first slot). For a specific configuration process, refer to an implementation process and an example of the following steps S206 to S208. Details are not described herein in this application.

Figure 15:
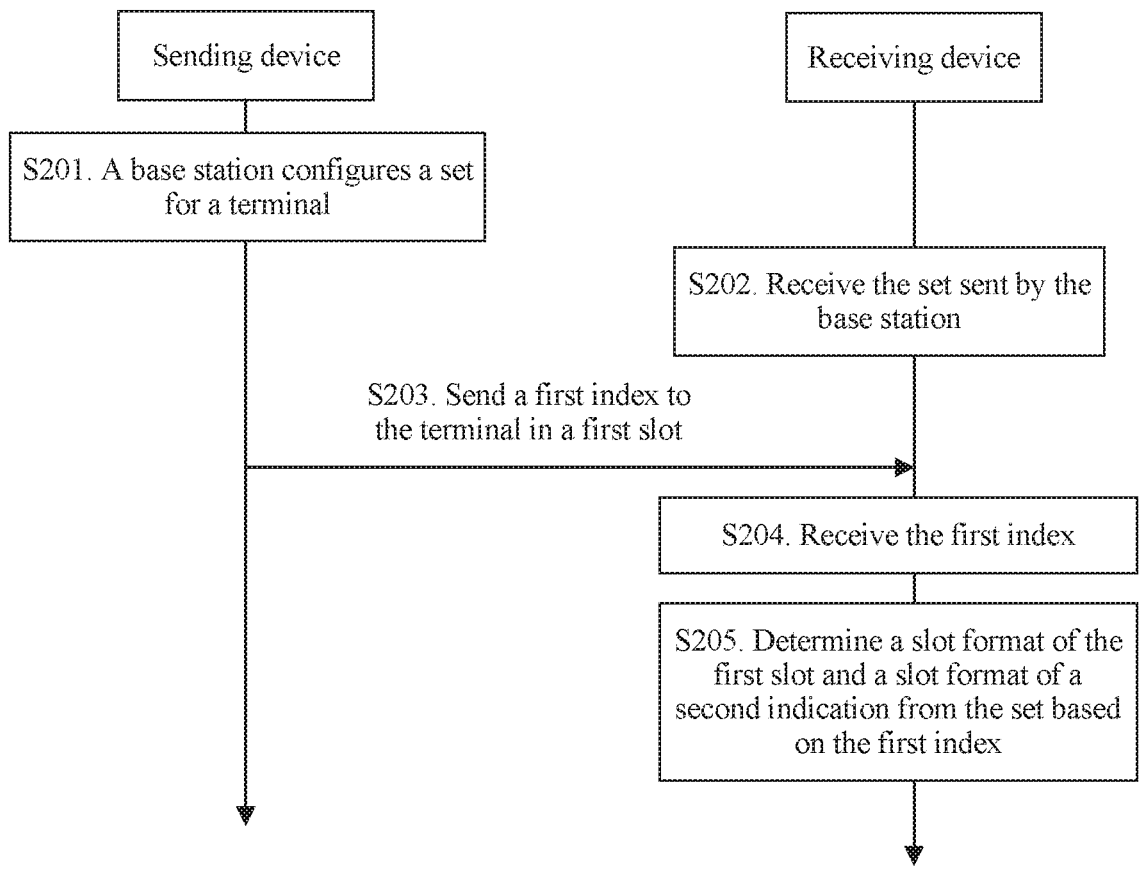
FIG. 15 is an eighth schematic flowchart of an indication method according to an embodiment of the present invention.

In another embodiment of this application, as shown in FIG. 15, a method provided in this application further includes the following steps.

S201. A base station configures a set for a terminal, where the set includes at least one index, and the index indicates slot formats of two different slots.

Optionally, the set includes at least one pair of slot format indications and an index corresponding to each of the at least one pair of slot format indications. One pair of slot format indications is used to indicate slot formats of at least two different slots. For example, as shown in Table 1, only two slots are used as an example in Table 1. It may be understood that at least one slot other than the first slot and the second slot is usually included in an actual process.

TABLE 1

| | Set | |
| --- | --- | --- |
| Index | First slot | Second slot |
| Index 1 | Slot format 1 | Slot format 2 |
| Index 2 | Slot format 3 | Slot format 4 |
| Index 3 | Slot format 5 | Slot format 6 |

Optionally, the base station may configure the set for the terminal by using higher layer signaling, for example, radio resource control (Radio Resource Control, RRC) and Media Access Control (Media Access Control, MAC).

S202. The terminal receives the set sent by the base station.

Optionally, after receiving Table 1, the terminal may store Table 1 in the terminal, for example, in a memory of the terminal.

S203. The base station sends a first index to the terminal in a first slot, where the first index is used to determine a slot format of the first slot and a slot format of the second slot, the second slot is a slot after the first slot, and the slot format of the first slot and the slot format of the second slot are different.

Optionally, the first slot is a slot in which the terminal and the base station communicate with each other in a current scheduling period.

Optionally, the base station may send the first index to the terminal in a control information area of the first slot, for example, a PDCCH or a GC-PDCCH.

S204. The terminal receives, in the first slot, the first index sent by the base station.

S205. The terminal determines the slot format of the first slot and the slot format of the second slot from the set based on the first index, where the second slot is a slot after the first slot.

For example, the first index received by the terminal is the index 1 in the Table 1. In this case, based on Table 1, the terminal may use the slot format 1 as the slot format of the first slot, and use the slot format 2 as the slot format of the second slot.

In a possible implementation, the slot format of the first slot and file slot format of the second slot are different or the same.

In this application, the base station configures the set for the terminal, and sends the first index to the terminal, to determine the slot format of the first slot and the slot format of the second slot from the set based on the first index. The second slot is a slot after the first slot. The slot format of the first slot and the slot format of the second slot are different, because in this application, although only one first index is sent in one slot (for example, the first slot), two different slot formats may be determined based on the first index. Therefore, different slot formats may be configured for the first slot and the second slot. In comparison with the prior art in which only one slot format can be indicated in one slot, and two different slots have a same slot format by repeating the slot formation, in this application, different slot formats can be configured for different slots more flexibly.

Figure 16:
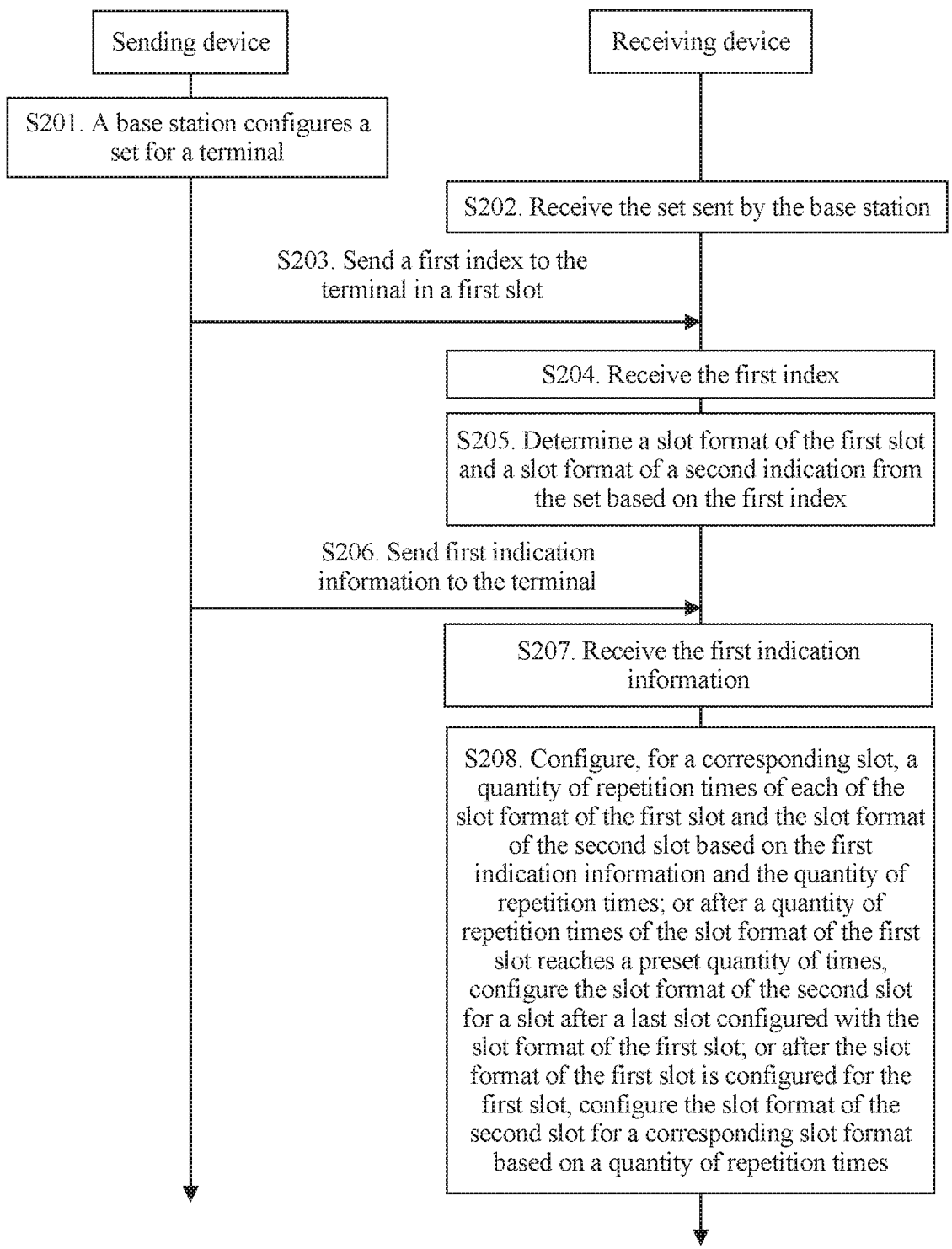
FIG. 16 is a ninth schematic flowchart of an indication method according to an embodiment of the present invention.

Optionally, in this application, after step S203, as shown in FIG. 16, the method provided in this application further includes the following steps:

S206. The base station sends first indication information to the terminal, where the first indication information is used to indicate at least one of N repetition times of the slot format of the first slot and the slot format of the second slot, M repetition times of the slot format of the first slot, and P repetition times of the slot format of the second slot.

S207. The terminal receives the first indication information sent by the base station, Optionally, after the terminal receives the first indication information, the method provided in this application further includes the following step:

S208. The terminal uses the slot format of the first slot and the slot format of the second slot as slot formats of each of N different slot combinations (a slot combination includes two slots) based on the first indication information; or uses the slot format of the first slot as a slot format of each of M slots based on a quantity of repetition times of the first slot, and then uses the slot format of the second slot as a slot format of an $(M+1)^{th}$ slot; or after using the slot format of the first slot as the slot format of the first slot, uses, as a slot format of each of P different slots, the slot format of the second slot that is repeated for P times; or uses the slot format of the first slot as a slot format of each of N different slots (including the first slot), and then uses the slot format of the second slot as a slot format of each of M different slots (the M different slots include the first slot).

It may be understood that, that the first indication information is used to indicate N repetition times of the slot format of the first slot and the slot format of the second slot means the following: The slot format of the first slot and the slot format of the second slot are used as a combination, and are used as the slot formats of each of the N different slot combinations (one slot combination includes two slots). A first slot format is used for a slot before the other slot in the two slots, and a second slot format is used for the other slot.

For example, there is a slot 1, a slot 2, a slot 3, a slot 4, a slot 5, and a slot 6, the slot format of the first slot 1 is a slot format 1, the slot format of the second slot is a slot format 2, and a quantity of repetition times is 3. After receiving the first indication information, the terminal may determine that a slot format of the slot 1 is the slot format 1, that a slot format of the slot 2 is the slot format 2, that a slot format of the slot 3 is the slot format 1, that a slot format of the slot 4 is the slot format 2, that a slot format of the slot 5 is the slot format 1, and that a slot format of the slot 6 is the slot format 2.

That the first indication information is used to indicate M times of the slot format of the first slot means the following: The terminal uses the slot format of the first slot as a slot format of each of M different slots, and then configures the slot format of the second slot as the slot format of an $(M+1)^{th}$ slot, and the $(M+1)^{th}$ slot is a next slot of a last slot that is in the M different slots and that is configured with the slot format of the first slot.

For example, there is a slot 1, a slot 2, a slot 3, a slot 4, a slot 5, and a slot 6, the slot format of the first slot is a slot format 1, a slot format of the slot 2 is a slot format 2, and a quantity of repetition times is 3. After receiving the first indication information, the terminal may determine that slot formats of the slot 1, the slot 2, and the slot 3 each are the slot format 1, and that a slot format of the slot 4 is the slot format 2.

That the first indication information is used to indicate P repetition times of the slot format of the second slot means the following: When determining the slot format of the first slot, the terminal uses the slot format of the second slot as a slot format of each of P different slots after the first slot.

For example, there is a slot 1, a slot 2, a slot 3, a slot 4, a slot 5, and a slot 6, the slot format of the first slot is a slot format 1, the slot format of the slot 2 is a slot format 2, and a quantity of repetition times is 3. After receiving the first indication information, the terminal may determine that a slat format of the slot 1 is the slot format 1, and that slot formats of the slot 2, and the slot 3, and the slot 4 each are the slot format 2.

In a possible implementation, in step S206, the first indication information may further indicate N repetition times of the slot format of the first slot, and M repetition times of the slot format of the second slot. In this case, the first indication information in this application is specifically used to instruct the terminal to use the slot format of the first slot as a slot format of each of N different slots, and use the slot format of the second slot as a slot format of each of different slots ranging from an $(N+1)^{th}$ slot to an $(N+M)^{th}$ slot.

For example, there is a slot 1, a slot 2, a slot 3, a slot 4, a slot 5, and a slot 6, the slot format of the first slot is a slot format 1, a slot format of the slot 2 is a slot format 2, a quantity of repetition times of the slot format of the first slot is 3, and a quantity of repetition times of the slot format of the second slot is 2. After receiving the first indication information, the terminal may determine that slot formats of the slot 1, the slot 2, and the slot 3 each are the slot format 1, and that slot formats of the slot 4 and the slot 5 each are the slot format 2.

Figure 17:
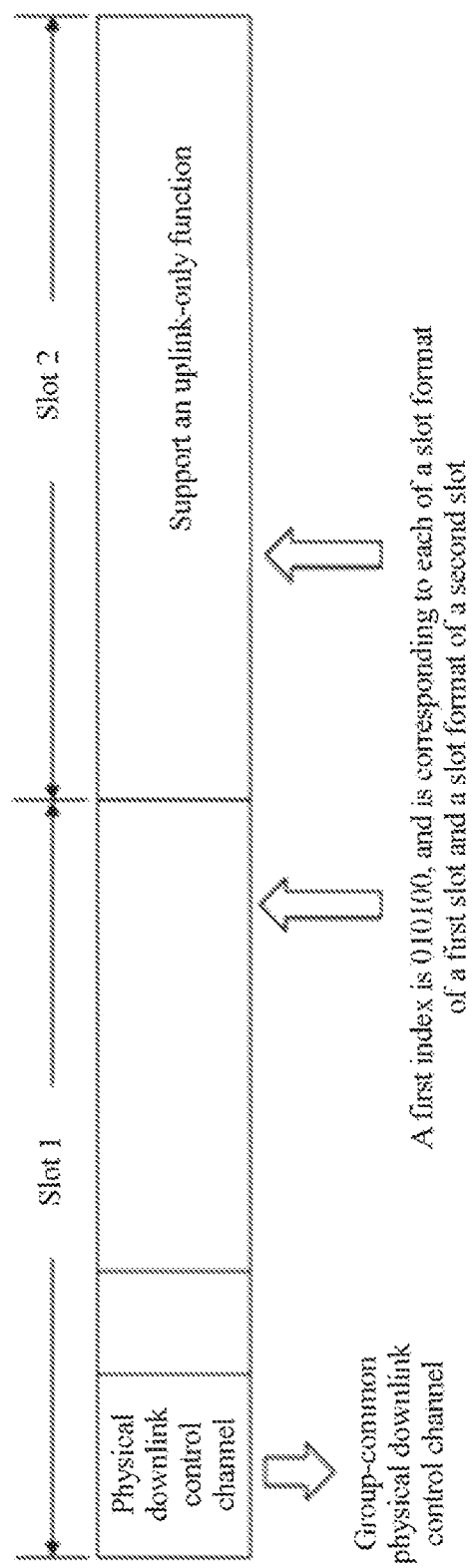
FIG. 17 is a fourth schematic diagram in which a slot format is configured according to an embodiment of the present invention.

For example, as shown in FIG. 17, a first index indicated by indication information sent by the base station is "010100". The first index is corresponding to a combination of a slot format of a current slot and a slot format of a next slot. The terminal obtains the first index through decoding, determines a slot format combination corresponding to the first index, and determines a slot format of a slot 1 and a slot format of a slot 2.

Optionally, in this application, a symbol at a first location in the slot format of the first slot is a downlink symbol, a symbol at a first location in the slot format of the second slot is a first symbol, and a function of the first symbol is different from a function of the downlink symbol.

In a possible implementation, the first symbol is a symbol that cannot carry indication information. For example, the function of the first symbol is any one of a reserved resource, an unknown resource, uplink transmission, or an empty resource.

Because in a combination of the two slot formats, the first symbol in the second slot cannot carry downlink transmission, there may be an association relationship between a current slot and one or more slots after the current slot, for example, in terms of an uplink-downlink symbol configuration, and a location at which a symbol function is an empty resource, an unknown resource, or a reserved resource. For example, there are some limitation relationships: The slot format of the second slot format is a slot format in which all symbols at locations corresponding to locations at which all downlink symbols or empty symbols are located in the slot format of the first slot are uplink symbols; or the slot format of the second slot is a slot format in which a symbol function at a location corresponding to a location at which a symbol occupied by a PDCCH is located in the slot format of the first slot is an unknown resource or a reserved resource, and all symbols at locations corresponding to locations at which remaining downlink symbols or empty symbols are located in the slot format of the first slot are uplink symbols; or a location at which a symbol function is an unknown resource or a reserved resource in the second slot includes a location at which a symbol function is an unknown resource or a reserved resource in the first slot.

Optionally, the slot format of the second slot meets at least one of the following conditions:

Condition 1: The symbol at the first location in the slot format of the second slot is an uplink symbol, and the first location is corresponding to a location at which a downlink symbol or an empty symbols located in the slot format of the first slot.

Condition 2: A location of an uplink symbol in the first slot is corresponding to a location of an uplink symbol in the second slot; a location of a reserved resource in the first slot is corresponding to a location of a reserved resource in the second slot; or a location at which a symbol function is an unknown resource in the first slot is corresponding to a location at which a symbol function is an unknown resource in the second slot.

Condition 3: The slot format of the second slot is a slot format in which a symbol at a location corresponding to a location at which a symbol occupied by a control channel is located in the slot format of the first slot is an unknown resource or an uplink symbol, and all symbols at locations corresponding to locations at which remaining downlink symbols or empty symbols are located in the slot format of the first slot are uplink symbols.

Condition 4: Locations at which a downlink symbol and an empty symbol are located in the slot format of the first slot are corresponding to locations at which uplink symbols or unknown resources are located in the slot format of the second slot.

Condition 5: A location at which a downlink symbol is located in the slot format of the first slot is corresponding to a location at which an uplink symbol or an unknown resource is located in the slot format of the second slot.

The solutions provided in the embodiments of this application are mainly described from a perspective of interaction between network elements. It may be understood that to implement the foregoing functions, each network element, for example, a sending device or a receiving device includes corresponding hardware structures and/or software modules for implementing the functions. A person skilled in the art should be easily aware that units and algorithm steps in the examples described with reference to the embodiments disclosed in this specification can be implemented in a form of hardware or in a form of a combination of hardware and computer software in this application. Whether the functions are performed by hardware or computer software driving hardware depends on particular applications and design constraint conditions of the technical solutions. A person skilled in the art may use different methods to implement the described functions for each particular application, but it should not be considered that the implementation goes beyond the scope of this application.

In the embodiments of this application, the sending device and the receiving device may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that the module division in the embodiments of this application is an example, and is merely logical function division and there may be another division manner in actual implementation. That each function module is obtained through division based on each corresponding function is used as an example for description below.

Figure 18:
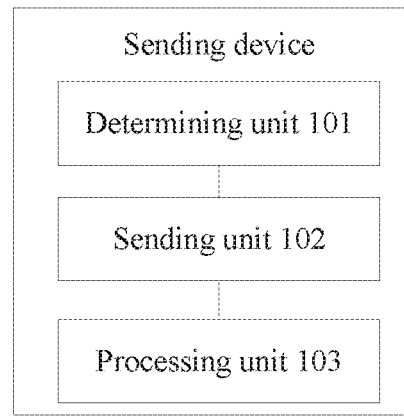
FIG. 18 is a first schematic structural diagram of a sending device according to an embodiment of the present invention.

When an integrated unit is used, FIG. 18 is a possible schematic structural diagram of a sending device in the foregoing embodiments. The sending device includes a determining unit 101 and a sending unit 102. The determining unit 101 is configured to support the sending device in performing step S101 (which may be specifically S1011 and S1012) in the foregoing embodiment. The sending unit 102 is configured to support the sending device in performing step S102 in the foregoing embodiment. In addition, the sending device provided in this application further includes a processing unit 103, further configured to support the sending device in performing steps S105, S106, S107, S108, and S109 in the foregoing embodiment, and/or performing another process of the technology described in this specification. All related content of the steps in the foregoing method embodiments may be cited in function descriptions of corresponding function modules, and details are not described herein again.

Based on hardware implementation, the determining unit 101 in this application may be a receiver of the sending device, the sending unit 102 may be a transmitter of the sending device, and the transmitter and the receiver of the sending device may be usually integrated together to form a transceiver. Specifically, the transceiver may also be referred to as a communications interface, and the processing unit 103 may be integrated into a processor of the sending device.

Figure 19:
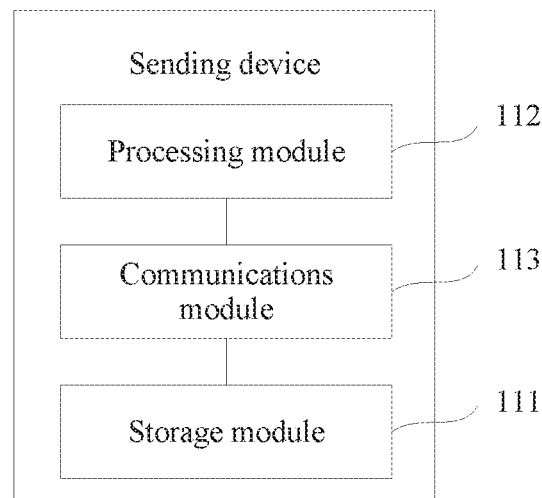
FIG. 19 is a second schematic structural diagram of a sending device according to an embodiment of the present invention.

When an integrated unit is used, FIG. 19 is a schematic diagram of a possible logical structure of a sending device in the foregoing embodiments. The sending device includes a processing module 112 and a communications module 113.

The processing module 112 is configured to control and manage an action of the sending device. For example, the processing module 112 is configured to support the sending device in performing step S101 (which may be specifically S1011 and S1012) and steps S105, S106, S107, S108, and S109 in the foregoing embodiment. The communications module 113 is configured to support the sending device in performing step S102 in the foregoing embodiment, and/or performing another process performed by a sending device in the technology described in this specification. The sending device may further include a storage module 111, configured to store program code and data of the sending device.

The processing module 112 may be a processor or a controller, for example, may be a central processing unit, a general purpose processor, a digital signal processor, an application-specific integrated circuit, a field programmable gate array or another programmable logic device, a transistor logic device, a hardware component, or any combination thereof. The processing module 112 may implement or execute various example logical blocks, modules, and circuits that are described with reference to the contents disclosed in the present invention. Alternatively, the processor may be a combination for implementing a computing function, for example, a combination of one or more microprocessors, or a combination of a digital signal processor and a microprocessor. The communications module 113 may be a transceiver, a transceiver circuit, a communications interface, or the like. The storage module 111 may be a memory.

Figure 20:
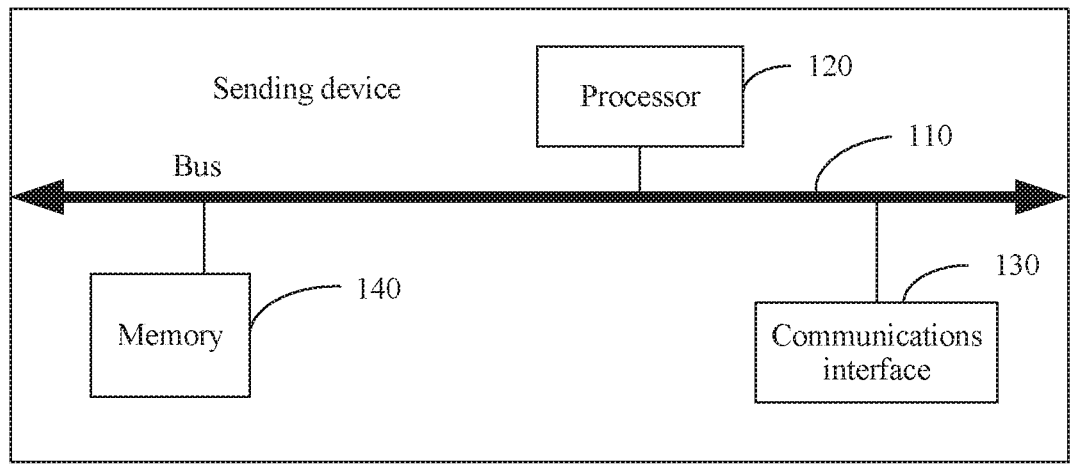
FIG. 20 is a third schematic structural diagram of a sending device according to an embodiment of the present invention.

When the processing module 112 is a processor 120, the communications module 113 is a communications interface 130 or a transceiver, and the storage module 111 is a memory 140, the sending device in this application may be a device shown in FIG. 20.

The communications interface 130, at least one processor 120, and the memory 140 are connected to each other by using a bus 110. The bus 110 may be a PCI bus, an EISA bus, or the like. The bus may be classified into an address bus, a data bus, a control bus, or the like. For ease of indication, the bus is indicated by using only one bold line in FIG. 20. However, it does not indicate that there is only one bus or only one type of bus. The memory 140 is configured to store program code and data of the sending device. The communications interface 130 is configured to support communication between the sending device and another device (for example, a receiving device). The processor 120 is configured to support the sending device in executing the program code and the data stored in the memory 140, to implement the indication method provided in this application.

Figure 21:
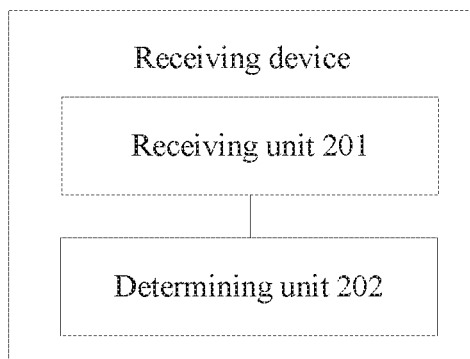
FIG. 21 is a first schematic structural diagram of a receiving device according to an embodiment of the present invention.

When an integrated unit is used, FIG. 21 is a possible schematic structural diagram of a receiving device in the foregoing embodiments. The receiving device includes a receiving unit 201. The receiving unit 201 is configured to support the receiving device in performing step S103 in the foregoing embodiment. In addition, the receiving device in this application further includes a determining unit 202, configured to support the receiving device in performing step S104 (which may be specifically steps S1041, S1042, S1043, S1044, S1045, S1046, S1047, S1048, S1049, and S1040) in the foregoing embodiment, and/or performing another process of the technology described in this specification. All related content of the steps in the foregoing method embodiments may be cited in function descriptions of corresponding function modules, and details are not described herein again.

Based on hardware implementation, the receiving unit 201 in this application may be a receiver of the receiving device, and the receiver and a transmitter of the receiving device may be usually integrated together to form a transceiver. Specifically, the transceiver may also be referred to as a communications interface, and the determining unit 202 may be integrated into a processor of the receiving device.

Figure 22:
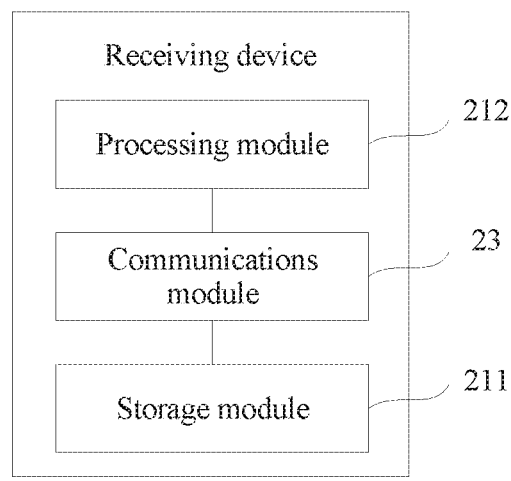
FIG. 22 is a second schematic structural diagram of a receiving device according to an embodiment of the present invention.

When an integrated unit is used, FIG. 22 is a schematic diagram of a possible logical structure of a receiving device in the foregoing embodiments. The receiving device includes a processing module 212 and a communications module 213. The processing module 212 is configured to control and manage an action of a sending device. For example, the processing module 212 is configured to support the receiving device in performing step S104 (which may be specifically steps S1041, S1042, S1043, S1044, S1045, S1046, S1047, S1048, S1049, and S1040) in the foregoing embodiment. The communications module 213 is configured to support the receiving device in performing step S103 in the foregoing embodiment, and/or performing another process performed by a receiving device in the technology described in this specification. The receiving device may further include a storage module 211, configured to store program code and data of the receiving device.

The processing module 212 may be a processor or a controller, for example, may be a central processing unit, a general purpose processor, a digital signal processor, an application-specific integrated circuit, a field programmable gate array or another programmable logic device, a transistor logic device, a hardware component, or any combination thereof. The processing module 212 may implement or execute various example logical blocks, modules, and circuits that are described with reference to the contents disclosed in the present invention. Alternatively, the processor may be a combination for implementing a computing function, for example, a combination of one or more microprocessors, or a combination of a digital signal processor and a microprocessor. The communications module 213 may be a transceiver, a transceiver circuit, a communications interface, or the like. The storage module 211 may be a memory.

Figure 23:
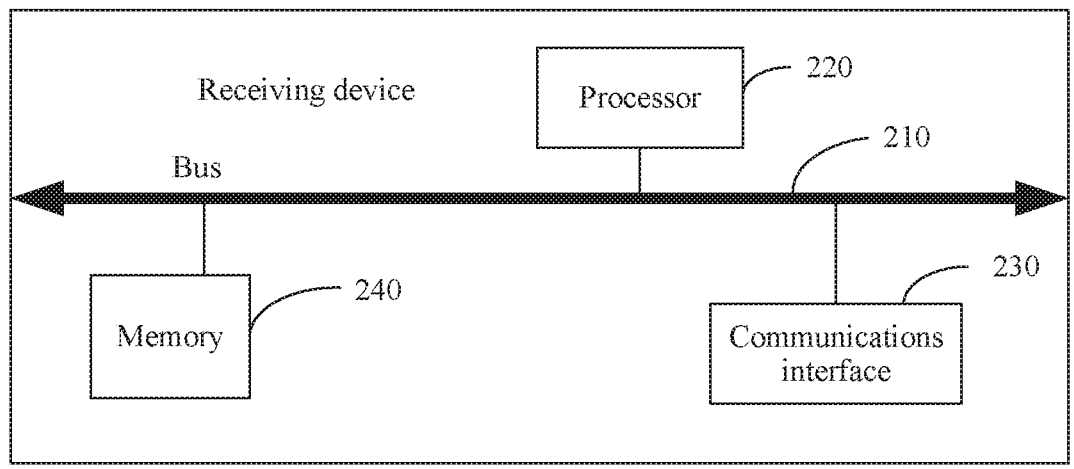
FIG. 23 is a third schematic structural diagram of a receiving device according to an embodiment of the present invention.

When the processing module 212 is a processor 220, the communications module 213 is a communications interface 230 or a transceiver, and the storage module 211 is a memory 240, the sending device in this application may be a device shown in FIG. 23.

The communications interface 230, at least one processor 220, and the memory 240 are connected to each other by using a bus 210, The bus 210 may be a PCI bus, an EISA bus, or the like. The bus may be classified into an address bus, a data bus, a control bus, or the like. For ease of indication, the bus is indicated by using only one bold line in FIG. 23. However, it does not indicate that there is only one bus or only one type of bus. The memory 240 is configured to store program code and data of the receiving device. The communications interface 230 is configured to support communication between the receiving device and another device (for example, a sending device). The processor 220 is configured to support the receiving device in executing the program code and the data stored in the memory 240, to implement the indication determining method provided in this application.

Figure 24:
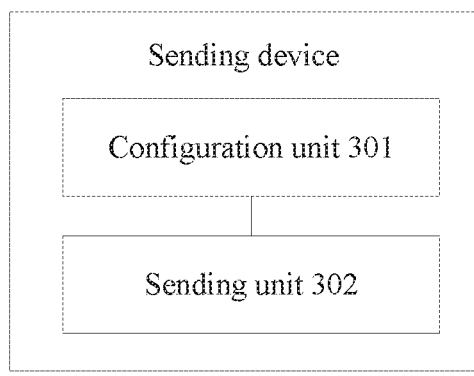
FIG. 24 is a fourth schematic structural diagram of a sending device according to an embodiment of the present invention.

When an integrated unit is used, FIG. 24 is a possible schematic structural diagram of a sending device in the foregoing embodiments. The sending device includes a configuration unit 301 and a sending unit 302. The configuration unit 301 is configured to support the sending device in performing step S201 in the foregoing embodiment. The sending unit 302 is configured to support the sending device in performing steps S203 and S206 in the foregoing embodiment, and/or performing another process of the technology described in this specification. All related content of the steps in the foregoing method embodiments may be cited in function descriptions of corresponding function modules, and details are not described herein again.

Based on hardware implementation, the sending unit in this application may be a transmitter of the sending device, and the transmitter and a receiver of the sending device may be usually integrated together to form a transceiver. Specifically, the transceiver may also be referred to as a communications interface, and the configuration unit 301 may be integrated into a processor of the sending device.

Figure 25:
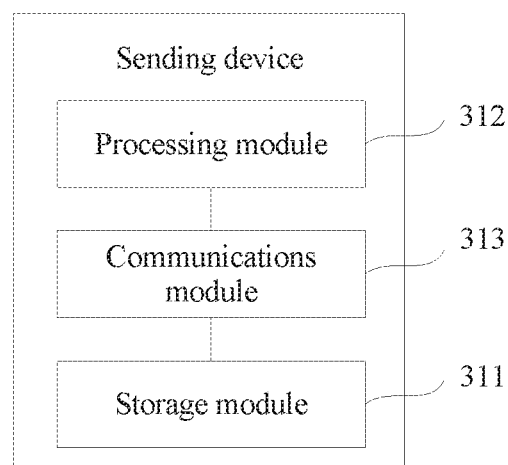
FIG. 25 is a fifth schematic structural diagram of a sending device according to an embodiment of the present invention.

When an integrated unit is used, FIG. 25 is a schematic diagram of a possible logical structure of a sending device in the foregoing embodiments. The sending device includes a processing module 312 and a communications module 313. The processing module 312 is configured to control and manage an action of the sending device. For example, the processing module 312 is configured to support the sending device in performing step S301 in the foregoing embodiment. The communications module 313 is configured to support the sending device in performing steps S203 and S206 in the foregoing embodiment, and/or performing another process performed by a sending device in the technology described in this specification. The sending device may further include a storage module 311, configured to store program code and data of the sending device.

The processing module 312 may be a processor or a controller, for example, may be a central processing unit, a general purpose processor, a digital signal processor, an application-specific integrated circuit, a field programmable gate array or another programmable logic device, a transistor logic device, a hardware component, or any combination thereof. The processing module 312 may implement or execute various example logical blocks, modules, and circuits that are described with reference to the contents disclosed in the present invention. Alternatively, the processor may be a combination for implementing a computing function, for example, may be a combination of one or more microprocessors, or a combination of a digital signal processor and a microprocessor. The communications module 313 may be a transceiver, a transceiver circuit, a communications interface, or the like. The storage module 311 may be a memory.

Figure 26:
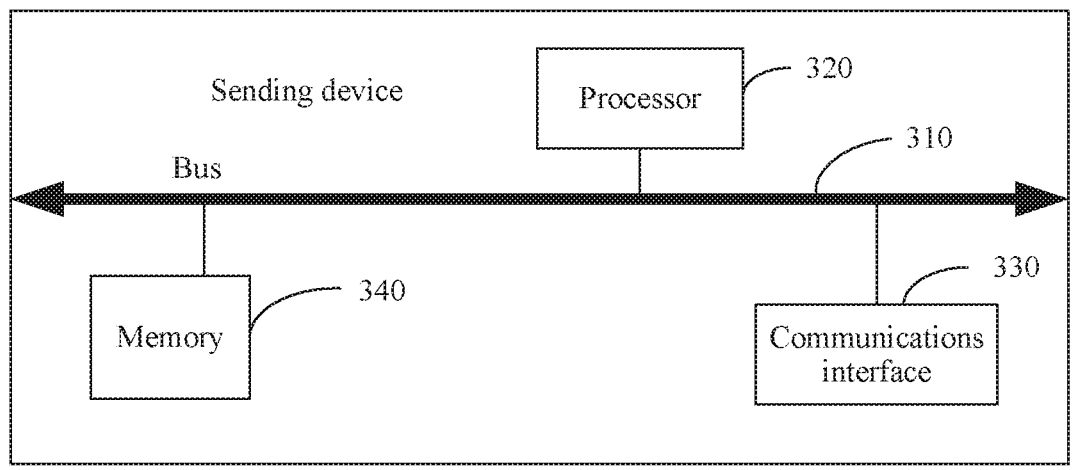
FIG. 26 is a sixth schematic structural diagram of a sending device according to an embodiment of the present invention.

When the processing module 312 is a processor 320, the communications module 313 is a communications interface 330 or a transceiver, and the storage module 311 is a memory 340, the sending device in this application may be a device shown in FIG. 26.

The communications interface 330, at least one processor 320, and the memory 340 are connected to each other by using a bus 310. The bus 310 may be a PCI bus, an EISA bus, or the like. The bus may be classified into an address bus, a data bus, a control bus, or the like. For ease of indication, the bus is indicated by using only one bold line in FIG. 26. However, it does not indicate that there is only one bus or only one type of bus. The memory 340 is configured to store program code and data of the sending device. The communications interface 330 is configured to support communication between the sending device and another device (for example, a receiving device). The processor 320 is configured to support the sending device in executing the program code and the data stored in the memory 340, to implement the indication method provided in this application.

In addition, the receiving unit 201 of the sending device shown in FIG. 21 is further configured to support the receiving device in performing steps S202 and S207 in the foregoing embodiment, and the determining unit 202 is further configured to support the receiving device in performing steps S204, S205, and S208 in the foregoing embodiment.

In addition, the processing module 212 of the receiving device shown in FIG. 22 is further configured to support the receiving device in performing steps S204, S205, and S208 in the foregoing embodiment. The communications module 213 is further configured to support the receiving device in performing steps S202 and S207 in the foregoing embodiment.

Figure 27:
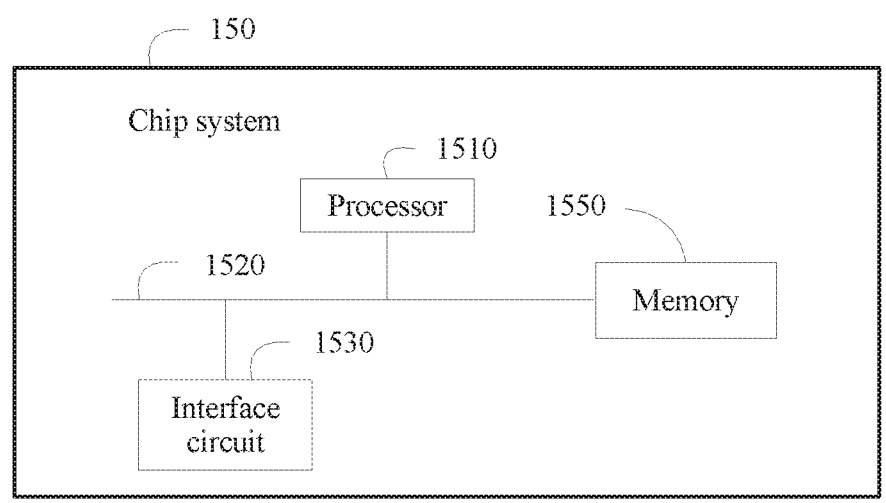
FIG. 27 is a schematic structural diagram of a chip system according to an embodiment of the present invention.

FIG. 27 is a schematic structural diagram of a chip system 150 according to an embodiment of the present invention. The chip system 150 includes at least one processor 1510, a memory 1550, and an interface circuit 1530. The memory 1550 may include a read-only memory and a random access memory, and provide an operation instruction and data for the processor 1510. A part of the memory 1550 may further include a nonvolatile random access memory (NVRAM).

In some implementations, the memory 1550 stores the following elements: an executable module or a data structure, or a subset thereof, or an extended set thereof.

In this embodiment of the present invention, the processor 1510 performs corresponding operations by invoking the operation instruction (the operation instruction may be stored in an operating system) stored in the memory 1550.

In a possible implementation, a structure of a chip system used by a sending device is similar to a structure of a chip system used by a receiving device, but different apparatuses use different chip systems to implement respective functions.

The processor 1510 controls operations of the sending device and the receiving device, and the processor 1510 may also be referred to as a CPU (Central Processing Unit, central processing unit). The memory 1550 may include a read-only memory and a random access memory, and provide an instruction and data for the processor 1510. A part of the memory 1550 may further include a nonvolatile random access memory (NVRAM). In specific application, components of a CPE 140 are coupled together by using a bus system 1520. The bus system 1520 may include a power bus, a control bus, a status signal bus, and the like in addition to a data bus. However, for clarity of description, various buses are marked as the bus system 1520 in FIG. 27.

The methods disclosed in the foregoing embodiments of the present invention may be applied to the processor 1510, or be implemented by the processor 1510. The processor 1510 may be an integrated circuit chip and has a signal processing capability. In an implementation process, each step of the foregoing method may be completed by using an integrated logical circuit of hardware in the processor 1510 or an instruction in a form of software. The processor 1510 may be a general purpose processor, a digital signal processor (DSP), an application-specific integrated circuit (ASIC), a field programmable gate array (FPGA) or another programmable logic device, a discrete gate or transistor logic device, or a discrete hardware component. The processor 1510 may implement or perform all methods, steps, and logical block diagrams disclosed in the embodiments of the present invention. The general purpose processor may be a microprocessor or the processor may be any conventional processor, or the like. Steps of the methods disclosed with reference to the embodiments of the present invention may be directly performed and completed by a hardware decoding processor, or may be performed and completed by using a combination of hardware and software modules in the decoding processor.

The software module may be located in a mature storage medium in the art, such as a random access memory, a flash memory, a read-only memory, a programmable read-only memory, an electrically erasable programmable memory, or a register. The storage medium is located in the memory 1550, and the processor 1510 reads information in the memory 1550 and implements the steps of the foregoing method in combination with hardware of the processor 1510.

Optionally, the interface circuit 1530 is configured to perform receiving and sending steps of the sending device and the receiving device in the embodiments shown in FIG. 2, FIG. 5, FIG. 6, FIG. 9, FIG. 11, FIG. 12, FIG. 14, FIG. 15, and FIG. 16.

The processor 1510 is configured to perform processing steps of the sending device and the receiving device in the embodiments shown in FIG. 2, FIG. 5, FIG. 6, FIG. 9, FIG. 11, FIG. 12, FIG. 14, FIG. 15, and FIG. 16.

In the foregoing embodiments, the instruction stored in the memory for execution by the processor may be implemented in a form of a computer program product. The computer program product may be written into the memory in advance, or may be downloaded and installed in the memory in a form of software.

The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer readable storage medium, or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, microwave, or the like) manner. The computer readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk, SSD), or the like.

In an aspect, a computer storage medium is provided. The computer readable storage medium stores an instruction, and when the instruction runs on a sending device, the sending device is enabled to perform step S101 (which may be specifically S1011 and S1012) and steps S105, S106, S107, S108, S109, and S102 in the embodiment, and/or performs another process performed by a sending device in the technology described in this specification.

In another aspect, a computer storage medium is provided. The computer readable storage medium stores an instruction, and when the instruction runs on a receiving device, the receiving device is enabled to perform step S104 (which may be specifically steps S1041, S1042, S1043, S1044, S1045, S1046, S1047, S1048, S1049, and S1040) and step S103 in the embodiment, and/or performs another process performed by a receiving device in the technology described in this specification.

In still another aspect, a computer storage medium is provided. The computer readable storage medium stores an instruction, and when the instruction runs on a sending device, the sending device is enabled to perform step S201, step S203, and step S206 in the embodiment, and/or performs another process performed by a sending device in the technology described in this specification.

According to yet another aspect, a computer storage medium is provided. The computer readable storage medium stores an instruction, and when the instruction runs on a receiving device, the receiving device is enabled to perform steps S204, S205, S208, S202, and S207 in the embodiment, and/or performs another process performed by a receiving device in the technology described in this specification.

In an aspect, a computer program product including an instruction is provided. The computer program product stores the instruction, and when the instruction runs on a sending device, the sending device is enabled to perform step S101 (which may be specifically, S1011 and S1012) and steps S105, S106, S107, S108, S109, and S102 in the embodiment, and/or performs another process performed by a sending device in the technology described in this specification.

In another aspect, a computer program product including an instruction is provided. The computer program product stores the instruction, and when the instruction runs on a receiving device, the receiving device is enabled to perform step S104 (which may be specifically steps S1041, S1042, S1043, S1044, S1045, S1046, S1047, S1048, S1049, and S1040) and step S103 in the embodiment, and/or performs another process performed by a receiving device in the technology described in this specification.

In still another aspect, a computer program product including an instruction is provided. The computer program product stores the instruction, and when the instruction runs on a sending device, the sending device is enabled to perform steps S201, S203, and S206 in the embodiment, and/or performs another process performed by a sending device in the technology described in this specification.

In yet another aspect, a computer program product including an instruction is provided. The computer program product stores the instruction, and when the instruction runs on a receiving device, the receiving device is enabled to perform steps S204, S205, S208, S202, and S207 in the embodiment, and/or performs another process performed by a receiving device in the technology described in this specification.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual needs to achieve the objectives of the solutions of the embodiments.

In addition, function units in the embodiments of this application may be integrated into one processing unit, or each of the units may exist alone physically, or two or more units are integrated into one unit.

When the functions are implemented in a form of a software function unit and sold or used as an independent product, the functions may be stored in a computer readable storage medium. Based on such an understanding, the technical solutions of this application essentially, or the pail contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An indication determining method, implemented by a receiving device, comprising:
   receiving, in a first slot, first indication information and second indication information that are from a sending device, wherein the first indication information and the second indication information are carried on one control channel;
   determining a sequence of obtaining the first indication information and the second indication information from the control channel; and
   determining, based on the sequence, that the first indication information indicates a first slot format of the first slot and that the second indication information indicates a second slot format of a second slot, wherein the second slot is a slot after the first slot, wherein the first slot format and the second slot format comprise an association relationship between them.

2. The indication determining method of claim 1, further comprising:
   determining the first slot format of the first slot based on the slot format from the first indication information; and
   determining the second slot format of the second slot based on the slot format indicated by the second indication information.

3. The indication determining method of claim 1, wherein receiving, in the first slot, the first indication information and the second indication information that are from the sending device comprises:
   receiving the first indication information on a first resource; and
   receiving the second indication information on a second resource, wherein the first resource and the second resource are different.

4. The indication determining method of claim 3, wherein the first resource is a first frequency domain resource and the second resource is a second frequency domain resource.

5. The indication determining method of claim 3, wherein the first resource is a first time domain resource and the second resource is a second time domain resource.

6. The indication determining method of claim 3, wherein the first resource is a first control resource set and the second resource is a second control resource set.

7. The indication determining method of claim 3, wherein the first resource is a first control channel and the second resource is a second control channel.

8. The indication determining method of claim 3, further comprising determining that the first indication information indicates a first slot format of the first slot when the first resource carries a first control channel.

9. The indication determining method of claim 8, further comprising determining that the first indication information indicates the first slot format of the first slot when the first resource carries the first control channel.

10. The indication determining method of claim 1, further comprising:
    determining that the first indication information indicates the first slot format of the first slot when the first indication information carries a first value; and
    determining that the second indication information indicates the second slot format of the second slot when the second indication information carries a second value, wherein the first value and the second value are different.

11. The indication determining method of claim 1, further comprising:
    determining that the first indication information indicates the first slot format of the first slot when a first control channel on which the first indication information is located carries a third value; and
    determining that the second indication information indicates the second slot format of the second slot when a second control channel on which the second indication information is located carries a fourth value, wherein the third value and the fourth value are different.

12. An indication determining method, implemented by a receiving device, comprising:
    receiving a set from a sending device, wherein the set comprises at least one index, and wherein the index indicates two different slot formats;

receiving, in a first slot, a first index from the sending device; and determining, from the set, a first slot format of the first slot and a second slot format of a second slot based on the first index, wherein the second slot is a slot after the first slot, wherein the first slot format and the second slot format comprise an association relationship between them.

13. The indication determining method of claim 1, further comprising receiving the association relationship from the sending device.

14. The indication determining method of claim 12, wherein a symbol at a first location in the first slot format of the first slot is a downlink symbol and a symbol at a second location in the second slot format of the second slot is a first symbol, and wherein a function of the first symbol is different from a function of the downlink symbol.

15. The indication determining method of claim 12, wherein the slot format of the second slot meets at least one of the following conditions:
   a symbol at a first location in the second slot format of the second slot is an uplink symbol, wherein the first location in the slot format of the second slot corresponds to a location at which a downlink symbol or an empty symbol is located in the slot format of the first slot;
   a location of an uplink symbol in the first slot corresponds to a location of the uplink symbol in the second slot;
   the slot format of the second slot comprises a symbol function at a location corresponding to a location at which a symbol occupied by a control channel is located in the first slot format of the first slot is an unknown resource or an uplink transmission, wherein all symbols at locations corresponding to locations at which remaining downlink symbols or empty symbols are located in the slot formation of the first slot are uplink symbols;
   locations at which the downlink symbol and the empty symbol are located in the first slot format of the first slot correspond to locations at which uplink symbols or unknown resources are located in the second slot format of the second slot; or
   a location at which the downlink symbol is located in the slot format of the first slot corresponds to a location at which an uplink symbol or an unknown resource is located in the second slot format of the second slot.

16. The indication determining method of claim 12, further comprising receiving first indication information from the sending device, wherein the first indication information indicates at least one of N repetition times of the first slot format of the first slot and the second slot format of the second slot, M repetition times of the first slot format of the first slot, and P repetition times of the second slot format of the second slot, and wherein N, M, and P are all integers greater than or equal to 2.

17. The indication determining method of claim 16, further comprising configuring, for a corresponding slot, a quantity of repetition times of the first slot format of the first slot and the second slot format of the second slot based on the first indication information and the quantity of repetition times.

18. The indication determining method of claim 12, wherein the second slot format of the second slot meets at least one of the following conditions:
   a symbol at a first location in the second slot format of the second slot is an uplink symbol, wherein the first location in the second slot format of the second slot corresponds to a location at which a downlink symbol or an empty symbol is located;
   a location of a reserved resource in the first slot corresponds to a location of a reserved resource in the second slot;
   the slot format of the second slot comprises a symbol function at a location corresponding to a location at which a symbol occupied by a control channel is located in the first slot format of the first slot is an unknown resource or uplink transmission, and all symbols at locations corresponding to locations at which remaining downlink symbols or empty symbols are located in the first slot formation of the first slot are uplink symbols;
   locations at which the downlink symbol and the empty symbol are located in the first slot format of the first slot correspond to locations at which uplink symbols or unknown resources are located in the slot format of the second slot; or
   a location at which the downlink symbol is located in the first slot format of the first slot corresponds to a location at which an uplink symbol or the unknown resource is located in the second slot format of the second slot.

19. The indication determining method of claim 12, wherein the second slot format of the second slot meets at least one of the following conditions:
   a symbol at a first location in the second slot format of the second slot is an uplink symbol, wherein the first location in the second slot format of the second slot corresponds to a location at which a downlink symbol or an empty symbol is located;
   a location at which a symbol function is an unknown resource in the first slot corresponds to a location at which a symbol function is an unknown resource in the second slot;
   the second slot format of the second slot comprises the symbol function at a location corresponding to a location at which a symbol occupied by a control channel is located in the first slot format of the first slot is the unknown resource or uplink transmission, and all symbols at locations corresponding to locations at which remaining downlink symbols or empty symbols are located in the first slot formation of the first slot are uplink symbols;
   locations at which the downlink symbol and the empty symbol are located in the first slot format of the first slot correspond to locations at which uplink symbols or unknown resources are located in the second slot format of the second slot; or
   a location at which the downlink symbol is located in the first slot format of the first slot corresponds to a location at which an uplink symbol or the unknown resource is located in the second slot format of the second slot.

20. The indication determining method of claim 12, wherein after a quantity of repetition times of the first slot format of the first slot reaches a preset quantity of times, the indication determining method further comprises configuring the second slot format of the second slot after a last slot configured with the first slot format of the first slot.

* * * * *